(12) United States Patent
Ramani et al.

(10) Patent No.: US 12,145,267 B2
(45) Date of Patent: Nov. 19, 2024

(54) SYSTEM AND METHOD FOR EMBODIED AUTHORING OF HUMAN-ROBOT COLLABORATIVE TASKS WITH AUGMENTED REALITY

(71) Applicant: Purdue Research Foundation, West Lafayette, IN (US)

(72) Inventors: Karthik Ramani, West Lafayette, IN (US); Ke Huo, Unico City, CA (US); Yuanzhi Cao, Redmond, WA (US); Tianyi Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 424 days.

(21) Appl. No.: 17/022,216

(22) Filed: Sep. 16, 2020

(65) Prior Publication Data
US 2021/0252699 A1     Aug. 19, 2021

Related U.S. Application Data

(60) Provisional application No. 62/902,007, filed on Sep. 18, 2019.

(51) Int. Cl.
*B25J 9/16* (2006.01)
(52) U.S. Cl.
CPC ................... *B25J 9/1605* (2013.01)
(58) Field of Classification Search
None
See application file for complete search history.

(56) References Cited

U.S. PATENT DOCUMENTS

| 10,899,017 B1* | 1/2021 | De Sapio | B25J 11/008 |
| 2011/0270135 A1* | 11/2011 | Dooley | G16H 50/30 |
| | | | 600/595 |

(Continued)

OTHER PUBLICATIONS

Kazuya Otani, Generating Assistive Humanoid Motions for Co-Manipulation Tasks with a Multi-Robot Quadratic Program Controller, 2018 IEEE International Conference on Robotics and Automation. Video complementing the text https://www.youtube.com/watch?v=D8Lkc1SUSUk (Year: 2018).*

(Continued)

*Primary Examiner* — Jaime Figueroa
*Assistant Examiner* — Arslan Azhar
(74) *Attorney, Agent, or Firm* — Maginot, Moore & Beck LLP

(57) ABSTRACT

A system and method for authoring and performing Human-Robot-Collaborative (HRC) tasks is disclosed. The system and method adopt an embodied authoring approach in Augmented Reality (AR), for spatially editing the actions and programming the robots through demonstrative role-playing. The system and method utilize an intuitive workflow that externalizes user's authoring as demonstrative and editable AR ghost, allowing for spatially situated visual referencing, realistic animated simulation, and collaborative action guidance. The system and method utilize a dynamic time warping (DTW) based collaboration model which takes the real-time captured motion as inputs, maps it to the previously authored human actions, and outputs the corresponding robot actions to achieve adaptive collaboration.

11 Claims, 18 Drawing Sheets

(56) References Cited

U.S. PATENT DOCUMENTS

| | | | | |
|---|---|---|---|---|
| 2015/0039106 | A1* | 2/2015 | Bonstrom | G06V 40/23 700/91 |
| 2016/0257000 | A1* | 9/2016 | Guerin | B25J 9/1671 |
| 2020/0130190 | A1* | 4/2020 | Thackston | B25J 9/1689 |
| 2021/0069894 | A1* | 3/2021 | Rod | G02B 27/0179 |

OTHER PUBLICATIONS

Madeline Gannon, Madeline, The Robot Tamer, YouTube Video https://www.youtube.com/watch?v=7eJYny82I2Y (Year: 2018).*
Luka Peternel, Towards Multi-Modal Intention Interfaces for Human-Robot Co-Manipulation, 2016 IEEE/RSJ International Conference on Intelligent Robots and Systems (IROS) Daejeon Convention Center. (Year: 2016).*
"HoloLens 2," Microsoft, 2019, retrieved from Internet: https://www.microsoft.com/en-CY/hololens (4 pages).
"Oculus VR Headsets and Equipment," Facebook Technologies, Inc., 2019, retrieved from Internet: https://www.oculus.com/ (7 pages).
"OptiTrack—Motion Capture Systems," NaturalPoint, Inc. DBA OptiTrack, 2019, retrieved from Internet: https://optitrack.com/ (4 pages).
"Gazebo," Open Source Robotics Foundation, 2019, retrieved from Internet: http://gazebosim.org/ (7 pages).
"ROS.org Powering the world's robots," ROS, 2019, retrieved from Internet: https://www.ros.org/ (2 pages).
Bischoff, M., "ROS#," 2019, retrieved from Internet: https://github.com/siemens/ros-sharp (4 pages).
"Motion Capture," Xsens, 2019, retrieved from Internet: https://www.xsens.com/motion-capture (12 pages).
Amor, H. B. et al., "Interaction Primitives for Human-Robot Cooperation Tasks," IEEE International Conference on Robotics & Automation (ICRA), 2014, 2831-2837 (7 pages).
Andersen, R. S. et al., "Projecting Robot Intentions into Human Environments," 25th IEEE Symposium on Robot and Human Interactive Communication (RO-MAN), Aug. 2016, 294-301 (8 pages).
Bauer, A. et al., "Human-Robot Collaboration: A Survey," International Journal of Humanoid Robotics, Dec. 2007, vol. 12, No. 8 (20 pages).
Billard, A. et al., "Robot Programming by Demonstration," Uncorrected Proof, Springer Handbook of Robotics, 2008 (25 pages).
Billinghurst, M. et al., "A Survey of Augmented Reality," Foundations and Trends in Human-Computer Interaction, 2014, vol. 8, No. 2-3, 73-272 (204 pages).
Billon, R. et al., "Gesture Recognition in Flow based on PCA Analysis using Multiagent System," Advances in Computer Entertainment Technology, 2008, 139-146 (8 pages).
Cao, Y. et al., "Ani-Bot: A Modular Robotics System Supporting Creation, Tweaking, and Usage with Mixed-Reality Interactions," 12th International Conference on Tangible, Embedded, and Embodied Interaction (TEI '18), 2018 (10 pages).
Cao, Y. et al., V.Ra: An In-Situ Visual Authoring System for Robot-IoT Task Planning with Augmented Reality, Proceedings of the 2019 on Designing Interactive Systems Conference, Jun. 2019, ACM, 1059-1070 (12 pages).
Chadalavada, R. J. et al., "That's on my Mind! Robot to Human Intention Communication through on-board Projection on Shared Floor Space," IEEE European Conference on Mobile Robots (ECMR), 2015 (6 pages).
Chernova, S. et al., "Robot learning from human teachers. Synthesis Lectures on Artificial Intelligence and Machine Learning #28," Morgan & Claypool Publishers, 2014 (121 pages).
Chong, J. W. S. et al., "Robot programming using augmented reality: An interactive method for planning collision-free paths," Robotics and Computer-Integrated Manufacturing, 2009, vol. 25, 689-701 (13 pages).

Daniel, C. et al., "Learning Concurrent Motor Skills in Versatile Solution Spaces," IEEE/RSJ International Conference on Intelligent Robots and Systems, Oct. 2012, 3591-3597 (7 pages).
Ende, T. et al., "A Human-Centered Approach to Robot Gesture Based Communication within Collaborative Working Processes," IEEE/RSJ International Conference on Intelligent Robots and Systems, Sep. 2011, 3367-3374 (8 pages).
Evrard, P. et al., "Teaching Physical Collaborative Tasks: Object-Lifting Case Study with a Humanoid," 9th IEEE-RAS International Conference on Humanoid Robots, Dec. 2009, 399-404 (6 pages).
Ewerton, M. et al., "Learning Multiple Collaborative Tasks with a Mixture of Interaction Primitives," IEEE International Conference on Robotics and Automation (ICRA), May 2015, 1535-1542 (8 pages).
Fang, H. C. et al., "Interactive robot trajectory planning and simulation using Augmented Reality," Robotics and Computer-Integrated Manufacturing, vol. 28, No. 2, Apr. 2012, 227-237 (11 pages).
Fang, H. C. et al., "A novel augmented reality-based interface for robot path planning," International Journal on Interactive Design and Manufacturing, 2014, vol. 8, 33-42 (10 pages).
Frank, J. A. et al., "Toward Mobile Mixed-Reality Interaction With Multi-Robot Systems," IEEE Robotics and Automation Letters, Oct. 2017, vol. 2, No. 4, 1901-1908 (8 pages).
Fung, R. et al., "An Augmented Reality System for Teaching Sequential Tasks to a Household Robot," 20th IEEE International Symposium on Robot and Human Interactive Communication, 2011, 282-287 (6 pages).
Ganesan, R. K., "Mediating Human-Robot Collaboration through Mixed Reality Cues", 2017, Ph.D. Dissertation, Arizona State University (56 pages).
Ghiringhelli, F. et al., "Interactive Augmented Reality for Understanding and Analyzing Multi-Robot Systems," IEEE/RSJ International Conference on Intelligent Robots and Systems (IROS 2014), Sep. 2014, 1195-1201 (7 pages).
Hashimoto, S. et al., "TouchMe: An Augmented Reality Based Remote Robot Manipulation," In Proceedings of 21st International Conference on Artificial Reality and Telexistence, 2011 (6 pages).
Hedayati, H. et al., "Improving Collocated Robot Teleoperation with Augmented Reality," The 13th Annual ACM/IEEE International Conference on Human Robot Interaction, Mar. 2018, 78-86 (9 pages).
Heun, V. et al., "Reality Editor: Programming Smarter Objects," International Joint Conference on Pervasive and Ubiquitous Computing (UbiComp), Sep. 2013, 307-310 (4 pages).
Huo, K. et al., "Scenariot: Spatially Mapping Smart Things Within Augmented Reality Scenes," Conference on Human Factors in Computing Systems, Apr. 2018, Paper 219 (13 pages).
Huo, K. et al., "SynchronizAR: Instant Synchronization for Spontaneous and Spatial Collaborations in Augmented Reality," In Proceedings of ACM Symposium on User Interface Software and Technology, Oct. 2018, 19-30 (12 pages).
Ishii, K. et al., "Drag-and-Drop Interface for Registration-Free Object Delivery," 19th IEEE International Symposium on Robot and Human Interactive Communication, Sep. 2010, 228-233 (6 pages).
Jackson, A. et al., "The Benefits of Teaching Robots using VR Demonstrations," ACM/IEEE International Conference on Human Robot Interaction, Mar. 2018, 129-130 (2 pages).
Kasahara, S. et al., "exTouch: Spatially-Aware Embodied Manipulation of Actuated Objects Mediated by Augmented Reality," International Conference on Tangible, Embedded, and Embodied Interaction, Feb. 2013, 223-226 (4 pages).
Kehoe, B. et al., "A Survey of Research on Cloud Robotics and Automation," IEEE Transactions on Automation Science and Engineering, vol. 12, No. 2, Apr. 2015, 398-409 (12 pages).
Klein, G. et al., "Common Ground and Coordination in Joint Activity," Organizational simulation 53, 2005, 139-184 (46 pages).
Koppula, H. et al., "Anticipatory Planning for Human-Robot Teams," In Experimental Robotics, 2016, 453-470 (15 pages).
Larochelle, B. et al., "Multi-View Operator Control Unit to Improve Situation Awareness in USAR Missions," The 21st IEEE Interna-

(56) References Cited

OTHER PUBLICATIONS tional Symposium on Robot and Human Interactive Communication, Sep. 2012, 1103-1108 (6 pages).
Lindlbauer, D. et al., "Remixed Reality: Manipulating Space and Time in Augmented Reality," Conference on Human Factors in Computing Systems, Apr. 2018, Paper 129 (13 pages).
Liu, K. et al., "Roboshop: Multi-layered Sketching Interface for Robot Housework Assignment and Management," Conference on Human Factors in Computing Systems, May 2011, 647-656 (10 pages).
Maeda, G. et al., "Phase estimation for fast action recognition and trajectory generation inhuman-robot collaboration," The International Journal of Robotics Research, 2017, vol. 36 (13-14), 1579-1594 (16 pages).
Maeda, G. J. et al., "Probabilistic movement primitives for coordination of multiple human-robot collaborative tasks," Autonomous Robots, vol. 41, 593-612 (21 pages).
Magnenat, S. et al., "Enhancing Robot Programming with Visual Feedback and Augmented Reality," Innovation and Technology in Computer Science Education Conference, Jul. 2014, 153-158 (6 pages).
Millard, A. G. et al., "ARDebug: An Augmented Reality Tool for Analysing and Debugging Swarm Robotic Systems," Frontiers in Robotics and AI, Jul. 2018, vol. 5, Article 87 (6 pages).
Niekum, S. et al., "Learning and Generalization of Complex Tasks from Unstructured Demonstrations," IEEE/RSJ International Conference on Intelligent Robots and Systems, Oct. 2012, 5239-5246 (8 pages).
Nikolaidis, S. et al., "Mathematical Models of Adaptation in Human-Robot Collaboration," arXiv:1707.02586v2, Aug. 2017 (7 pages).
Nikolaidis, S. et al., "Game-Theoretic Modeling of Human Adaptation in Human-Robot Collaboration," ACM/IEEE International Conference on Human Robot Interaction, Mar. 2017, 323-331 (9 pages).
Nikolaidis, S. et al., "Efficient Model Learning from Joint-Action Demonstrations for Human-Robot Collaborative Tasks," ACM/IEEE International Conference on Human Robot Interaction, Mar. 2015, 189-196 (8 pages).
Nikolaidis, S. et al., "Human-Robot Cross-Training: Computational Formulation, Modeling and Evaluation of a Human Team Training Strategy," ACM/IEEE International Conference on Human Robot Interaction, 2013, 33-40 (8 pages).
Nikolaidis, S. et al., "Human-Robot Mutual Adaptation in Shared Autonomy," ACM/IEEE International Conference on Human-Robot Interaction, Mar. 2017, 294-302 (9 pages).
Pardowitz, M. et al., "Incremental Learning of Tasks From User Demonstrations, Past Experiences, and Vocal Comments," IEEE Transactions on Systems, Man, and Cybernetics—Part B: Cybernetics, Apr. 2007, vol. 37, No. 2, 322-332 (11 pages).
Peternel, L. et al., "Teaching robots to cooperate with humans in dynamic manipulation tasks based on multi-modal human-in-the-loop approach," Autonomous Robots, 2014, vol. 36, 123-136 (15 pages).
Rosen, E. et al., "Communicating Robot Arm Motion Intent Through Mixed Reality Head-mounted Displays," arXiv:1708.03655v1, Aug. 2017 (16 pages).
Sakamoto, D. et al., "Graphical Instruction for Home Robots," Computer, IEEE Computer Society, 2016, vol. 49, No. 7 (6 pages).
Sakoe, H. et al., "Dynamic Programming Algorithm Optimization for Spoken Word Recognition," IEEE, 1978, 159-165 (7 pages).
Saunders, J. et al., "Teaching Robots by Moulding Behavior and Scaffolding the Environment," ACM/IEEE International Conference on Human-Robot Interaction, Mar. 2006, 118-125 (8 pages).
Sefidgar, Y. S. et al., "RobotIST: Interactive Situated Tangible Robot Programming," Proceedings of the Symposium on Spatial User Interaction, Oct. 2018 (9 pages).
Sempena, S. et al., "Human Action Recognition Using Dynamic Time Warping," International Conference on Electrical Engineering and Informatics, Jul. 2011 (5 pages).
Shah, J. et al., "Improved Human-Robot Team Performance Using Chaski, A Human-Inspired Plan Execution System," ACM/IEEE International Conference on Human-Robot Interaction, Mar. 2011, 29-36 (8 pages).
Shon, A. P. et al., "Robotic Imitation from Human Motion Capture using Gaussian Processes," Proceedings of 5th IEEE-RAS International Conference on Humanoid Robots, 2005, 129-134 (6 pages).
Stiefelhagen, R. et al., "Natural Human-Robot Interaction using Speech, Head Pose and Gestures," Proceedings of IEEE/RSJ, International Conference on Intelligent Robots and Systems, 2004, 2422-2427 (6 pages).
Szafir, D. et al., "Designing planning and control interfaces to support user collaboration with flying robots," The International Journal of Robotics Research, vol. 36 (5-7), 2017, 514-542 (29 pages).
Thomaz, A. et al., "Computational Human-Robot Interaction," Foundations and Trends in Robotics, 2013, vol. 4, No. 2-3, 105-223 (122 pages).
Vogt, D. et al., "A System for Learning Continuous Human-Robot Interactions from Human-Human Demonstrations," IEEE International Conference on Robotics and Automation (ICRA), 2017, 2882-2889 (8 pages).
Vogt, D. et al., "One-shot learning of human-robot handovers with triadic interaction meshes," Autonomous Robots, 2018, vol. 42, 1053-1065 (14 pages).
Walker, M. et al., "Communicating robot motion intent with augmented reality," In Proceedings of the 2018 ACM/IEEE International Conference on Human-Robot Interaction, 2018, 316-324 (13 pages).
Xia, H. et al., "Spacetime: Enabling Fluid Individual and Collaborative Editing in Virtual Reality," ACM Symposium on User Interface Software and Technology (UIST), Oct. 2018, 853-866 (14 pages).

* cited by examiner

Algorithm 1 Calculate Projected Curve and Projection Matrix

1: procedure PCAPROJECTION($I_{G_i}[1\ldots n]$)
2: $\quad \overline{I_{G_i}} \leftarrow (\Sigma I_{G_i})/(9*n)$
3: $\quad V \leftarrow (I_{G_i} - \overline{I_{G_i}})(I_{G_i} - \overline{I_{G_i}})^T$
4: $\quad$ Let $v_1$ and $v_2$ be two eigen vectors associated with the largest eigen values of $V$.
5: $\quad$ output $P_{G_i} \leftarrow [v_1, v_2]^T$
6: $\quad$ output $f_{G_i} \leftarrow P_{T_i} I_{T_i}$

FIG. 14

Algorithm 2 Calculate DTW Distance Matrix

1: procedure DTWDISTANCEMATRIX($s[1\ldots n], t[1\ldots m]$)
2:     $D \leftarrow array[0\ldots n, 0\ldots m]$
3:     for $i \leftarrow 1, n$ do $D[i, 0] \leftarrow \infty$
4:     for $i \leftarrow 1, m$ do $D[0, i] \leftarrow \infty$
5:     for $i \leftarrow 1, n$ do
6:         for $j \leftarrow 1, m$ do
7:             $D[i, j] \leftarrow \|s[i] - t[j]\| + min(D[i-1, j], D[i-1, j-1], D[i, j-1])$
8:     return $D$

FIG. 15

Algorithm 3 Progress Estimation Using DTW

1: $d_{old} \leftarrow array[0\ldots n], d_{new} \leftarrow array[0\ldots n]$
2: for $i \leftarrow 0, n$ do $d_{old}[i, 0] \leftarrow \infty$
3: for $i \leftarrow 0, n$ do $d_{new}[i, 0] \leftarrow 0$
4: while Synchronized Task $S_i$ has started do
5:     if $v_{t_{now}}$ is updated then
6:         $f_{t_{now}} \leftarrow P_{S_i} v_{t_{now}}$
7:         for $i \leftarrow 1, n$ do
8:             $d_{new}[i] \leftarrow \|f_{S_i}[i] - f_{t_{now}}\| + min(d_{new}[i-1], d_{old}[i-1], d_{new}[i])$
9:         $n^* \leftarrow \arg\min_{1 \leq i \leq n}(d_{new}[i]/\sqrt{i})$
10:        $d_{old} \leftarrow d_{new}$
11:        output $progress \leftarrow n^*/n$

FIG. 16

SYSTEM AND METHOD FOR EMBODIED AUTHORING OF HUMAN-ROBOT COLLABORATIVE TASKS WITH AUGMENTED REALITY

This application claims the benefit of priority of U.S. provisional application Ser. No. 62/902,007, filed on Sep. 18, 2019 the disclosure of which is herein incorporated by reference in its entirety.

GOVERNMENT LICENSE RIGHTS

This invention was made with government support under contract number 1839971 awarded by the National Science Foundation. The government has certain rights in the invention.

FIELD

The device and method disclosed in this document relates to augmented reality and, more particularly, to embodied authoring of human-robot-collaborative tasks with augmented reality.

BACKGROUND

Unless otherwise indicated herein, the materials described in this section are not prior art to the claims in this application and are not admitted to the prior art by inclusion in this section.

Robotics has been extensively used to automate a large number of particular and repetitive tasks with high accuracy and throughput in manufacturing environments. The tremendous economic and social impacts projected by robotics are likely to expand in the future by infiltrating into broader fields in both commercial and consumer markets. Unlike traditional manufacturing environments, these new commercial and market segments, such as medical, health care, and services, usually heavily involve human activities in the working environments. Thus, enabling robots to co-work with humans in collaborative tasks has become a significant pillar of the next generation robotics technology.

A typical human-robot-collaborative task involves generating a joint intention, planning actions, and acting cooperatively. In a human-centered task, the joint intention usually aligns with humans' implicit or explicit expressions. Explicit communications such as speech and gestures have been widely studied for commanding robots. However, using these modalities may cause inefficiencies and ambiguities in spatially and temporally coordinated collaborations that require a comprehensive understanding of the contexts. On the other hand, embodied demonstrations from humans directly convey the intentions to the robots. More importantly, to avoid programming robots' behaviors for the highly dynamic human-robot interactions, researchers have proposed programming by demonstration (PbD) to generate task and action plans for the robots. Further, to safely and robustly execute the action plans in a coordinated manner, humans and robots need to communicate with their status, actions, and intentions in a timely manner.

The advents of mobile computing have fostered the evolution of authoring workflows in an in-situ and ad-hoc fashion. However, existing workflows primarily target pre-defined and rigorous tasks in which robots operate in isolation and interact only with the environment. To enable novice user-friendly programming by demonstration in an authoring workflow, it would be advantageous to support human motion capture and inference which traditionally involve a motion capture system. Since a body-suit or an external camera based capture system requires heavy dependencies, demonstrations are often only captured offline. Moreover, for ad-hoc tasks, demonstrating with users' bodies is preferable. Recently, emerging augmented/virtual reality (AR/VR) technologies, such as head-mounted AR/VR devices, have shown strong potential to enable embodied authoring. Further, in human-robot-collaborative tasks, robot partners should adapt to and coordinate with humans' actions. Thus, to create a joint action plan, the counterpart motions of the robots can only be demonstrated with the humans' part as contexts.

SUMMARY

A method for authoring a human-robot collaborative task in which a robot collaborates with a human is disclosed. The method comprises recording, with at least one sensor, human motions of a human as the human demonstrates the human-robot collaborative task in an environment, the recorded human motions including a plurality of recorded positions of the human in the environment over a period of time. The method further comprises displaying, on a display, a graphical user interface including a graphical representation of the recorded human motions that is superimposed on the environment based on the plurality of recorded positions of the human in the environment. The method further comprises determining, with a processor, based on user inputs received from the human, a sequence of robot motions to be performed by a robot in concert with a performance of human motions corresponding to the recorded human motions. The method further comprises storing, in a memory, the recorded human motions and the sequence of robot motions to be performed by the robot.

A method for operating a robot to collaborate with a human to perform a human-robot collaborative task is disclosed. The method comprises storing, in a memory, (i) recorded human motions including a plurality of recorded positions of a human in an environment over a period of time and (ii) a sequence of robot motions to be performed by the robot in concert with performance of human motions corresponding to the recorded human motions. The method further comprises detecting, with at the least one sensor, performance of human motions corresponding to the recorded human motions by the one of (i) the human and (ii) the further human. The method further comprises generating, with the processor, and transmitting to the robot, with a transceiver, a plurality of commands configured to operate the robot to perform the sequence of robot motions in concert with the performance of human motions corresponding to the recorded human motions. The method further comprises during the performance of human motions corresponding to the recorded human motions by the one of (i) the human and (ii) the further human, displaying, in a graphical user interface on a display, a virtual representation of a portion of the recorded human motions that have not yet been performed by the one of (i) the human and (ii) the further human, which is superimposed on the environment based on the plurality of recorded positions of the human in the environment.

BRIEF DESCRIPTION OF THE DRAWINGS

The foregoing aspects and other features of the method and system are explained in the following description, taken in connection with the accompanying drawings.

FIG. 14 shows pseudo-code for an algorithm for determining a projected curve and corresponding projection matrix.

FIG. 15 shows pseudo-code for an algorithm for determining a Dynamic Time Warping (DTW) distance matrix.

FIG. 16 shows pseudo-code for estimating a progress of real-time human motions using DTW.

DETAILED DESCRIPTION

Figure 1:
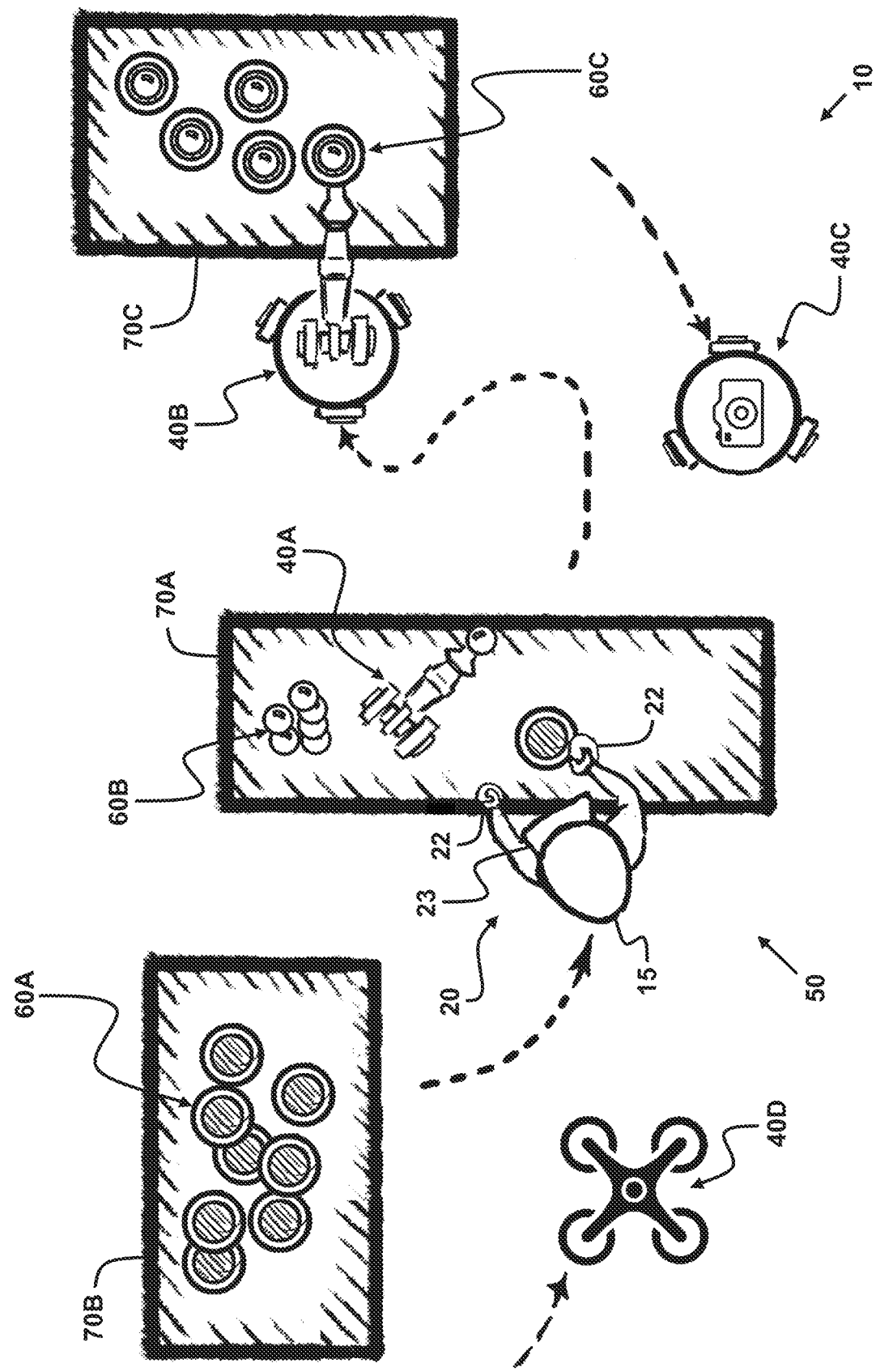
FIG. 1 shows a human-robot-collaborative system having an augmented reality (AR) system, utilized by a human collaborator, and one or more robot collaborators arranged throughout an environment.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 2:
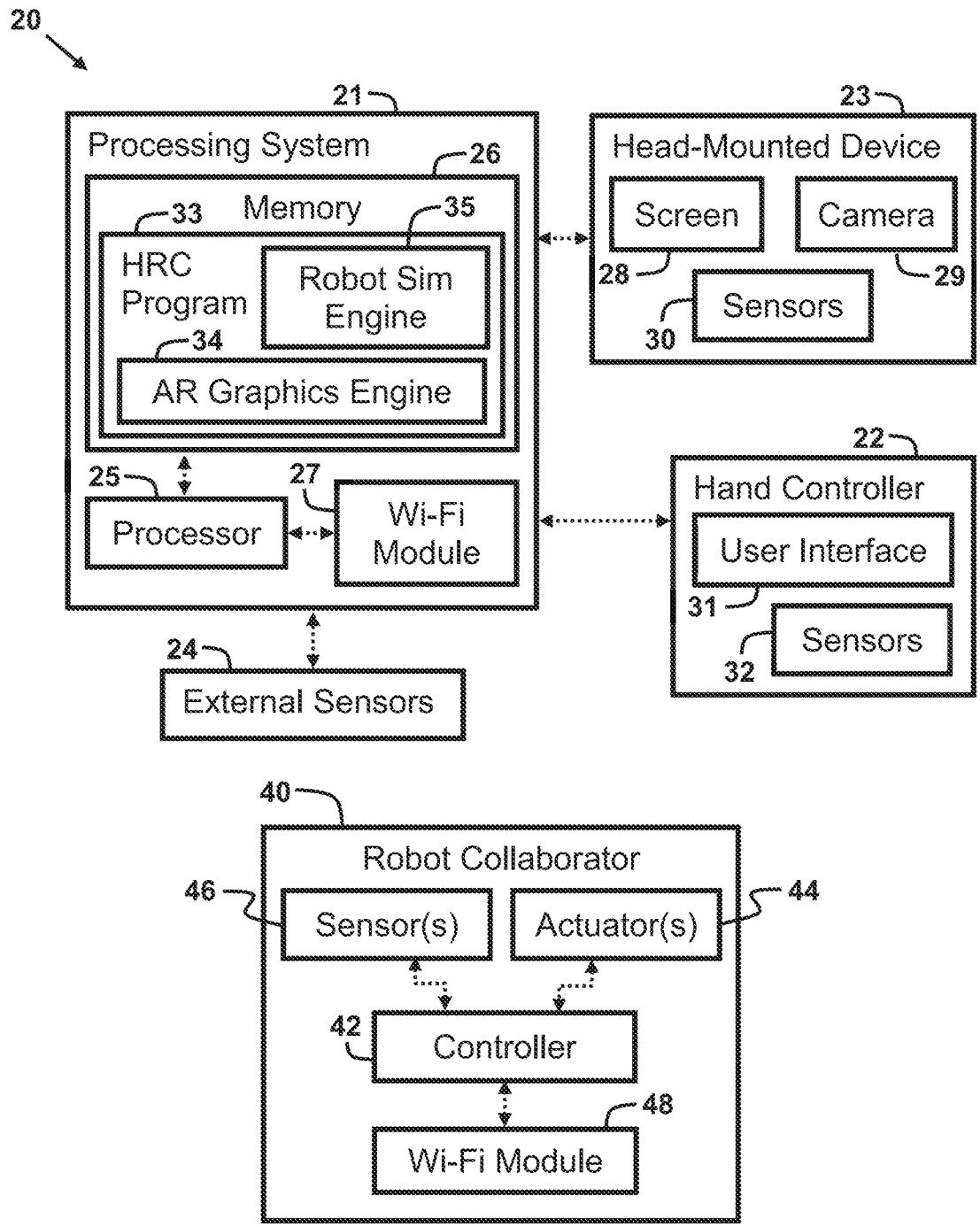
FIG. 2 shows exemplary components of the AR system and robot collaborator(s) of FIG. 1.

With reference to FIGS. 1-2, exemplary embodiments of a human-robot-collaborative (HRC) system 10 are described. The HRC system 10 utilizes a human-lead-robot-assist type of human-robot-collaboration model in which human-robot-collaborative (HRC) tasks are initiated by a human collaborator and robot collaborators acts adaptively to the human collaborator's actions. The HRC system 10 utilizes an augmented reality (AR) system to enable an intuitive authoring workflow for creating HRC tasks. Particularly, the AR system is used to externalize the user's authoring as a demonstrative and editable AR ghost, allowing for spatially situated visual referencing, realistic animated simulation, and collaborative action guidance. Once an HRC task has been authored, the AR system is used to provide visual guidance to a human collaborator performing an HRC task. During performance of an HRC task, a dynamic time warping (DTW) based collaboration model is utilized to map real-time motions of the human collaborator to the previously authored human actions and output the corresponding robot actions to achieve adaptive collaboration.

The HRC system 10 has a variety of advantageous features. First, the HRC system 10 utilizes AR to provide realistic visualization with contextual and spatial awareness, thereby enabling the user to intuitively create, edit, and preview the human-robot-collaborative tasks. Second, the HRC system 10 lowers the barrier for users to effectively program complex HRC tasks by enabling the user to program HRC tasks using natural body movements and intuitive interactions, using a Program-by-Demonstration (PbD) process. Third, when performing the human-robot-collaborative tasks, the HRC system 10 supports real-time motion inference, activity detection, and visual feedback on robots' intents. Fourth, the HRC system 10 utilizes AR and realistic simulations to provide active and accurate visual feedback about what the user has authored, to ensure efficiency and correctness of the authoring. Fifth, the HRC system 10 provides a real-time processing and feedback such that the user can switch rapidly between HRC task authoring and HRC task performance, thereby enabling rapid iteration and testing.

As shown in FIG. 1, the HRC system 10 at least includes at least one AR system 20, at least part of which is worn or held by a human collaborator 15, and one or more robot collaborators 40A-D arranged throughout an environment 50. The robot collaborators 40A-D may include a variety of sensors and actuators configured to enable the robot collaborator to perform one or more tasks in collaboration with the human collaborator 15. In the illustrated example, a joint assembly task is performed by the human collaborator 15 in cooperation with robot collaborators 40A-D in which components 60A and 60B are assembled into a final product 60C. However, it will be appreciated that countless different HRC tasks can be performed by the HRC system 10 and the various HRC tasks described herein are merely exemplary.

In the illustrated embodiment, the robot collaborator 40A (which may be referred to herein as the "ArmBot") comprises a robotic arm having six degrees of freedom (e.g., Arduino Tinkerkit Braccio), which is fixedly mounted to a table 70A. In the illustrated example, the component 60A is brought to the table 70A from the table 70B by the human collaborator 15 and the robot collaborator 40A assembles the components 60A and 60B at the table 70A. The robot collaborator 40B (which may be referred to herein as the "GripperBot") comprises a robotic arm which is fixedly mounted to an omni-mobile platform having three motors configured to move the omni-mobile platform around the environment 50. In the illustrated example, the robot collaborator 40B transports the assembled final product 60C from the table 70A to the table 70C. The robot collaborator 40C (which may be referred to herein as the "CamBot")

comprises a video camera which is fixedly mounted to an omni-mobile platform having three motors configured to move the omni-mobile platform around the environment 50. In the illustrated example, the robot collaborator 40C might move around the environment 50, for example, to film the joint assembly task from start to finish. Finally, the robot collaborator 40D (which may be referred to herein as the "drone") comprises a flying quad-copter drone having a spotlight. In the illustrated example, the robot collaborator 40D might follow the human collaborator 15 to provide a spotlight as he or she navigates the environment 50. It will be appreciated that the particular robot collaborators described herein are merely exemplary and that countless different robot collaborators may be included in the HRC system 10.

With continued reference to FIG. 1, the AR system 20 preferably includes a head mounted AR device 23 having at least a camera and a display screen (not shown), but may include any mobile AR device, such as, but not limited to, a smartphone, a tablet computer, a handheld camera, or the like having a display screen and a camera (not shown). In one example, the head mounted AR device 23 is in the form of an AR or virtual reality headset (e.g., Microsoft's Holo-Lens, Oculus Rift, or Oculus Quest) having an integrated or attached stereo-camera (e.g., ZED Dual 4MP Camera (720p)). In at least some embodiments, the AR system 20 further includes at least one hand-held controller 22 (e.g., Oculus Touch Controllers) having a user interface configured to enable interactions with the HRC system 10.

The AR system 20 is configured to track human body motion of the human collaborator 15 within the environment 50, in particular positions and movements of the head and hands of the human collaborator 15. To this end, the AR system 20 may further include external sensors (e.g., Oculus IR-LED Sensors, not shown) for tracking the track human body motion of the human collaborator 15 within the environment 50. Alternatively, the AR system 20 may instead comprise inside-out motion tracking sensors integrated with the head mounted AR device 23 and configured to track human body motion of the human collaborator 15 within the environment 50.

FIG. 2 shows exemplary components of the AR system 20 and the robot collaborators 40A-D of the HRC system 10. It will be appreciated that the components of the AR system 20 and the robot collaborators 40A-D shown and described are merely exemplary and that the AR system 20 and the robot collaborators 40A-D may comprise any alternative configuration. Moreover, in the illustration of FIG. 2, only a single AR system 20 and a single robot collaborator 40 are shown. However, in practice the HRC system 10 may include one or a multiple AR systems 20 and may include multiple robot collaborators 40.

In the illustrated exemplary embodiment, the AR system 20 includes a processing system 21, the at least one hand-held controller 22, the head mounted AR device 23, and external sensors 24. In some embodiments, the processing system 21 may comprise a discrete computer that is configured to communicate with the at least one hand-held controller 22, and the head mounted AR device 23 via one or more wired or wireless connections. However, in alternative embodiments, the processing system 21 is integrated with the head mounted AR device 23. Additionally, in some embodiments, the external sensors 24 are omitted.

In the illustrated exemplary embodiment, the processing system 21 comprises a processor 25 and a memory 26. The memory 26 is configured to store data and program instructions that, when executed by the processor 25, enable the AR system 20 to perform various operations described herein. The memory 26 may be of any type of device capable of storing information accessible by the processor 25, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 25 may include a system with a central processing unit, graphics processing units, multiple processing units, dedicated circuitry for achieving functionality, programmable logic, or other processing systems.

The processing system 21 further comprises one or more transceivers, modems, or other communication devices configured to enable communications with various other devices, at least including the robot collaborators 40A-D, the hand-held controllers 22, and the external sensors 24 (if applicable). Particularly, in the illustrated embodiment, the processing system 21 comprises a Wi-Fi module 27. The Wi-Fi module 27 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. As discussed in further detail below, the processor 25 is configured to operate the Wi-Fi module 27 to send and receive messages, such as control and data messages, to and from the robot collaborators 40A-D via the Wi-Fi network and/or Wi-Fi router. It will be appreciated, however, that other communication technologies, such as Bluetooth, Z-Wave, Zigbee, or any other radio frequency-based communication technology can be used to enable data communications between devices in the system 10.

In the illustrated exemplary embodiment, the head mounted AR device 23 comprises a display screen 28 and a camera 29. The camera 29 is configured to capture a plurality of images of the environment 50 as the head mounted AR device 23 is moved through the environment 50 by the human collaborator 15. The camera 29 is configured to generate image frames of the environment 50, each of which comprises a two-dimensional array of pixels. Each pixel has corresponding photometric information (intensity, color, and/or brightness). In some embodiments, the camera 29 is configured to generate RGB-D images in which each pixel has corresponding photometric information and geometric information (depth and/or distance). In such embodiments, the camera 29 may, for example, take the form of two RGB cameras configured to capture stereoscopic images, from which depth and/or distance information can be derived, or an RGB camera with an associated IR camera configured to provide depth and/or distance information.

The display screen 28 may comprise any of various known types of displays, such as LCD or OLED screens. In at least one embodiment, the display screen 28 is a transparent screen, through which a user can view the outside world, on which certain graphical elements are superimposed onto the user's view of the outside world. In the case of a non-transparent display screen 28, the graphical elements may be superimposed on real-time images/video captured by the camera 29. In further embodiments, the display screen 28 may comprise a touch screen configured to receive touch inputs from a user.

In some embodiments, the head mounted AR device 23 may further comprise a variety of sensors 30. In some embodiments, the sensors 30 include sensors configured to measure one or more accelerations and/or rotational rates of the head mounted AR device 23. In one embodiment, the sensors 30 comprises one or more accelerometers configured to measure linear accelerations of the head mounted AR device 23 along one or more axes (e.g., roll, pitch, and yaw axes) and/or one or more gyroscopes configured to measure rotational rates of the head mounted AR device 23 along one or more axes (e.g., roll, pitch, and yaw axes). In some embodiments, the sensors 30 may include inside-out motion tracking sensors configured to track human body motion of the human collaborator 15 within the environment 50, in particular positions and movements of the head and hands of the human collaborator 15.

The head mounted AR device 23 may also include a battery or other power source (not shown) configured to power the various components within the head mounted AR device 23, which may include the processing system 21, as mentioned above. In one embodiment, the battery of the head mounted AR device 23 is a rechargeable battery configured to be charged when the head mounted AR device 23 is connected to a battery charger configured for use with the head mounted AR device 23.

In the illustrated exemplary embodiment, the hand-held controller(s) 22 comprises a user interface 31 and sensors 32. The user interface 31 comprises, for example, one or more buttons, joysticks, triggers, or the like configured to enable the human collaborator 15 to interact with the HRC system 10 by providing inputs. In one embodiment, the sensors 30 may comprise one or more accelerometers configured to measure linear accelerations of the hand-held controller 22 along one or more axes and/or one or more gyroscopes configured to measure rotational rates of the hand-held controller 22 along one or more axes. The hand-held controller(s) 22 further include one or more transceivers (not shown) configured to communicate inputs from the human collaborator 15 to the processing system 21. In some embodiments, rather than being grasped by the user, the hand-held controller(s) 22 are in the form of a glove, which is worn by the user and the user interface includes sensors for detecting gesture-based inputs or the like.

The program instructions stored on the memory 26 include a human-robot-collaborative (HRC) program 33 (also referred to herein as "GhostAR"). As discussed in further detail below, the processor 25 is configured to execute the HRC program 33 to enable the authoring and performance of HRC tasks by the human collaborator 15 in collaboration with the robot collaborators 40A-D. In one embodiment, the HRC program 33 includes an AR (AR) graphics engine 34 (e.g., Unity3D engine), which acts as an intuitive visual interface for the HRC program 33. Particularly, the processor 25 is configured to execute the AR graphics program 34 to superimpose on the display screen 28 graphical elements for the purpose of authoring HRC tasks, as well as guiding the human collaborator 15 during performance of the HRC tasks. In the case of a non-transparent display screen 28, the graphical elements may be superimposed on real-time images/video captured by the camera 29. In one embodiment, the HRC program 33 further includes a robot simulation engine 35 (e.g., Robot Operating System-Gazebo), which can be executed by the processor 25 to simulate behavior of the robot collaborators 40A-D during the authoring of HRC tasks.

With continued reference to FIG. 2, in the illustrated exemplary embodiment, the robot collaborator 40 comprises a controller 42 (e.g., NVIDIA Jetson TX1 Development Kit), one or more actuators 44, and one or more sensors 46. The actuators 44 may comprise a wide variety of devices such as the robotic arms discussed above with respect to the robot collaborators 40A and 40B, the motors of the omni-mobile platforms discussed above with respect to the robot collaborators 40B and 40C, and propellers of the robot collaborators 40D. The sensors 46 may comprise a wide variety of sensors such as those used for navigation of the environment (e.g., a SICK TiM 561 2D LIDAR for SLAM navigation), or for other purposes relating to the operations performed by the particular robot collaborator, such as the camera of the robot collaborators 40C.

In at least one embodiment, the controller 42 comprises at least one processor with associated memory (not shown) which stores as program instructions that, when executed by the processor, enable the robot collaborator 40 to perform various operations described elsewhere herein. The memory of the controller 42 may be of any type of device capable of storing information accessible by the processor, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the controller 42 may include a system with a central processing unit, graphics processing units, multiple processing units, dedicated circuitry for achieving functionality, programmable logic, or other processing systems.

The robot collaborator 40 further comprises one or more transceivers, modems, or other communication devices configured to enable communications with various other devices, at least including the processing system 21 of the AR system 20. Particularly, in the illustrated embodiment, the robot collaborator 40 comprises a Wi-Fi module 48. The Wi-Fi module 48 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. As discussed in further detail below, the controller 42 is configured to operate the Wi-Fi module 48 to send and receive messages, such as control and data messages, to and from the processing system 21 of the AR system 20 via the Wi-Fi network and/or Wi-Fi router. It will be appreciated, however, that other communication technologies, such as Bluetooth, Z-Wave, Zigbee, or any other radio frequency-based communication technology can be used to enable data communications between devices in the system 10.

The robot collaborator 40 may also include a battery or other power source (not shown) configured to power the various components within the robot collaborator 40. In one embodiment, the battery of the robot collaborator 40 is a rechargeable battery configured to be charged when the robot collaborator 40 is connected to a battery charger configured for use with the robot collaborator 40.

In at least one embodiment, the memory of the controller 42 stores firmware and/or program instructions that enable the controller 42 to receive control messages having commands for the robot collaborator 40 from the processing system 21 of the AR system 20 and to operate the one or more actuators 44 based on the control messages. The controller 42 may be configured to operate the one or more actuators 44 to implement the commands in part with reference on sensor data received from the one or more sensors 46.

Methods for Operating the HRC System and AR System Thereof

The AR system 20 is configured to enable interactive embodied authoring and performance of HRC tasks using an AR-based graphical user interface on the display 28. To this end, the AR system 20 is configured to provide a variety of AR graphical user interfaces and interactions therewith which can be accessed in the following five modes of the AR system 20: Human Authoring Mode, Observation Mode, Robot Authoring Mode, Preview Mode, and Action Mode. In the Human Authoring Mode, the AR system 20 enables the user to record a Human Motion Clip corresponding to collaborative human motions of an HRC task. In the Observation Mode, the AR system 20 enables a user visualize and edit the authored Human Motion Clip by displaying an AR ghost on the display 28. In the Robot Authoring Mode, the AR system 20 enables the user to author collaborative robot motions of the HRC task by manipulating a virtual robot, with the AR ghost displayed as a visual reference of authored Human Motion Clip. In the Preview Mode, the AR system 20 enables the user to visualize the entire HRC task simulation by animating the collaborative motions of the human collaborator 15 and the robot collaborator(s) using AR ghosts. Finally, in the Action Mode, the AR system 20 enables the human collaborator 15 to perform the HRC task in collaboration with the robot collaborator(s) 40.

A variety of methods, workflows, and processes are described below for enabling the operations and interactions of the Human Authoring Mode, Observation Mode, Robot Authoring Mode, Preview Mode, and Action Mode of the AR system 20. In these descriptions, statements that a method, workflow, processor, and/or system is performing some task or function refers to a controller or processor (e.g., the processor 25 or the controller 42) executing programmed instructions (e.g., the HRC program 33, the AR graphics engine 34, the robot simulation engine 35, and/or the program instructions of the controller 42) stored in non-transitory computer readable storage media (e.g., the memory 26 or a memory of the controller 42) operatively connected to the controller or processor to manipulate data or to operate one or more components in the HRC system 10 to perform the task or function. Additionally, the steps of the methods may be performed in any feasible chronological order, regardless of the order shown in the figures or the order in which the steps are described.

Additionally, various AR graphical user interfaces are described for operating the HRC program 33 in the Human Authoring Mode, Observation Mode, Robot Authoring Mode, Preview Mode, and Action Mode. In many cases, the AR graphical user interfaces include graphical elements that are superimposed onto the user's view of the outside world or, in the case of a non-transparent display screen 28, superimposed on real-time images/video captured by the camera 29. In order to provide these AR graphical user interfaces, the processor 25 executes instructions of the AR graphics engine 34 to render these graphical elements and operates the display 28 to superimpose the graphical elements onto the user's view of the outside world or onto the real-time images/video of the outside world. In many cases, the graphical elements are rendered at a position that depends upon positional or orientation information received from any suitable combination of the external sensor 24, the sensors 30, the sensor 32, the sensors 46, and the camera 29, so as to simulate the presence of the graphical elements in real-world the environment. However, it will be appreciated by those of ordinary skill in the art that, in many cases, an equivalent non-AR graphical user interface can also be used to operate the HRC program 33, such as a user interface provided on a further computing device such as laptop computer, tablet computer, desktop computer, or a smartphone.

Moreover, various user interactions with the AR graphical user interfaces and with interactive graphical elements thereof are described. In order to provide these user interactions, the processor 25 may render interactive graphical elements in the AR graphical user interface, receive user inputs from, for example, the user interface 31 of the hand-controller 22 or via gestures performed in view of the camera 29 or other sensor, and execute instructions of the HRC program 33 to perform some operation in response to the user inputs.

Finally, various forms of motion tracking are described in which spatial positions and motions of the human collaborator 15, of the robot collaborators 40A-D, or of other objects in the environment (e.g., the components 60A-C) are tracked. In order to provide this tracking of spatial positions and motions, the processor 25 executes instructions of the HRC program 33 to receive and process sensor data from any suitable combination of the external sensor 24, the sensors 30, the sensor 32, the sensors 46, and the camera 29, and may optionally utilize visual and/or visual-inertial odometry methods such as simultaneous localization and mapping (SLAM) techniques.

Authoring and Performing Human-Robot-Collaborative Tasks

Figure 3:
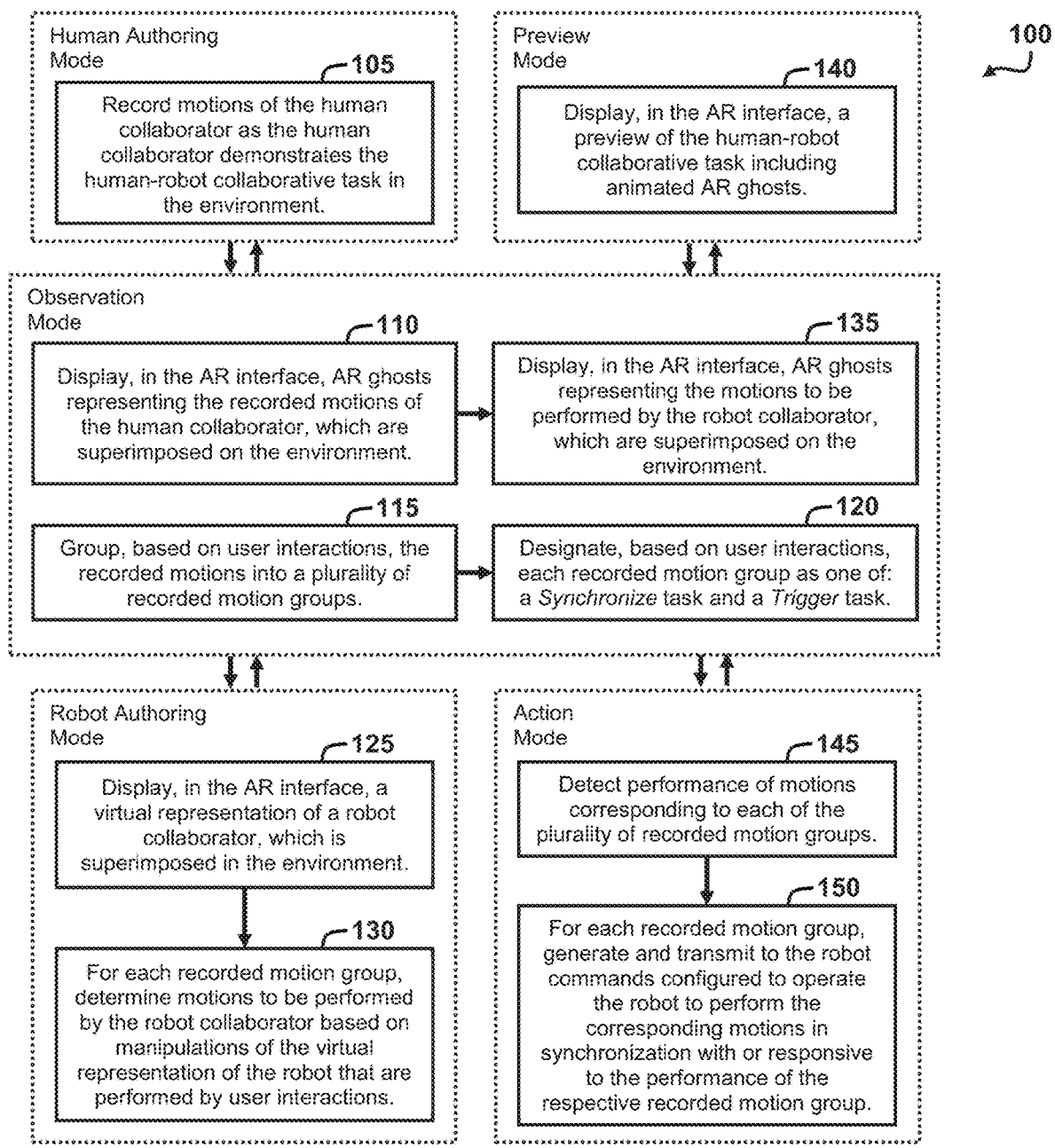
FIG. 3 shows a logical flow diagram for a method for operating the AR system to author and perform a human-robot collaborative (HRC) task.

FIG. 3 shows a logical flow diagram for a method 100 for operating the AR system 20 to author and perform a human-robot collaborative task. At the beginning of an authoring session using the AR system 20, the user is first asked to select or otherwise identify the robot collaborator(s) 40 that will be used in the HRC task, via a suitable graphical user interface. After initialization, the AR system 20 will begin operation in the Human Authoring Mode.

Figure 4:
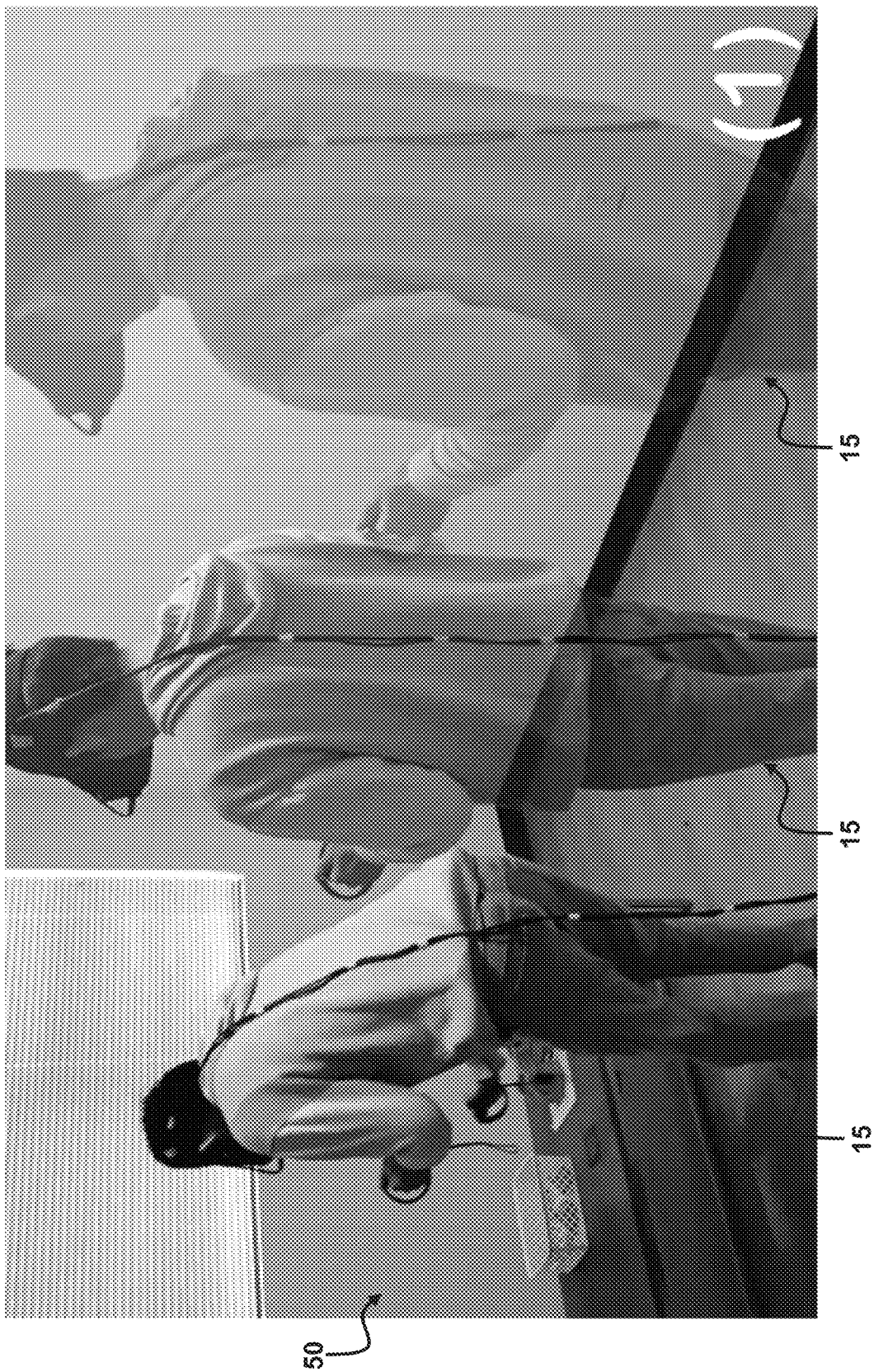
FIG. 4 shows a user moving throughout an environment during the course of role-playing the human actions required for the HRC task.

In the Human Authoring Mode, the method 100 proceeds with a step of recording motions of the human collaborator as the human collaborator demonstrates the human-robot collaborative task in the environment (block 105). Particularly, in the Human Authoring Mode, AR system 20 records a Human Motion Clip as the user role-plays the human actions required for the HRC task to be authored. As illustrated in FIG. 4, the user may move throughout the environment 50 during the course of role-playing the human actions required for the HRC task. It should be appreciated that the human collaborator 15 who performs an HRC task in collaboration with the robot collaborator(s) 40 may be the same person or a different person than the user operating the AR system 20 to author the HRC task. Accordingly, the term "user" and "human collaborator" should be understood as interchangeable as used herein.

The Human Motion Clip is the baseline of the HRC task and the authoring process. The Human Motion Clip defines the human motions that the robot collaborator 40 will collaborate with, as well as the movements that the human collaborator 15 needs to repeat during performance of the HRC task in Action Mode. Advantageously, the authoring of the Human Motion Clip is achieved through natural embodied movement, in which the AR system 20 tracks the position and orientation of the head mounted AR device 23 and the hand-held controller(s) 22, or equivalently tracks the position and orientation of the head and hands of the user. In particular, the processor 25 receives and processes sensor data from any suitable combination of the external sensor 24, the sensors 30, the sensor 32, the sensors 46, and the camera 29, to determine and record a plurality of positions of the head mounted AR device 23 and/or the hand-held controller(s) 22 in the environment 50 over a period of time.

In at least one embodiment, the resulting Human Motion Clip is a time sequence of motion frames, which may be captured with a predetermined capture rate, e.g. 90 Hz. Each motion frame has position and/or orientation information of the human collaborator 15 at a respective point in time. Particularly, each motion frame may, for example, be in the form of a position vector, which specifies the position and/or orientation of one or more key points of the human collaborator 15 at the respective point in time. For example, in one embodiment, each motion frame of the Human Motion Clip is represented by an $\mathbb{R}^9$ vector in the form:

$$v_{t_i} = [x_{t_i}^{head}, y_{t_i}^{head}, z_{t_i}^{head}, x_{t_i}^{left}, y_{t_i}^{left}, z_{t_i}^{left}, x_{t_i}^{right}, y_{t_i}^{right}, z_{t_i}^{right}]^T,$$

where $t_i$ is the time (or some equivalent index) of the particular motion frame, $[x_{t_i}^{head}, y_{t_i}^{head}, z_{t_i}^{head}]$ is a spatial position of the head of the human collaborator 15 and/or the head mounted AR device 23, $[x_{t_i}^{left}, y_{t_i}^{left}, z_{t_i}^{left}]$ is a spatial position of the left hand of the human collaborator 15 and/or the left-handed hand controller 22, and $[x_{t_i}^{right}, y_{t_i}^{right}, z_{t_i}^{right}]$ is a spatial position of the right hand of the human collaborator 15 and/or the right-handed hand controller 22.

In this manner, each Human Motion Clip comprises an $\mathbb{R}^9$ curve in the form:

$$L_{record} = [v_1, v_2, v_3, \ldots, v_N].$$

In some cases, an HRC task will include collaborations with multiple human collaborators 15. Accordingly, in the Human Authoring Mode, the AR system 20 allows the user to record multiple Human Motion Clips, one corresponding to each human collaborator 15 that is to participate in the HRC task. A single user can record the Human Motion Clip for each human collaborator 15 that is to participate in the HRC task one at time, or multiple users each having their own head mounted AR device 23 and hand-held controller(s) 22 can record respective Human Motion Clips simultaneously.

In at least some embodiments, the user is provided with an AR graphical user interface on the display screen 28 of the AR system 20, which enables the user to, for example, start and stop the recording of the Human Motion Clip, save the Human Motion Clip, delete the Human Motion Clip, or re-record the Human Motion Clip. It will be appreciated by those of ordinary skill in the art that, in many cases, an equivalent non-AR graphical user interface can also be used to operate the HRC program 33, such as a user interface provided on a further computing device such as laptop computer, tablet computer, desktop computer, or a smartphone.

Figure 5:
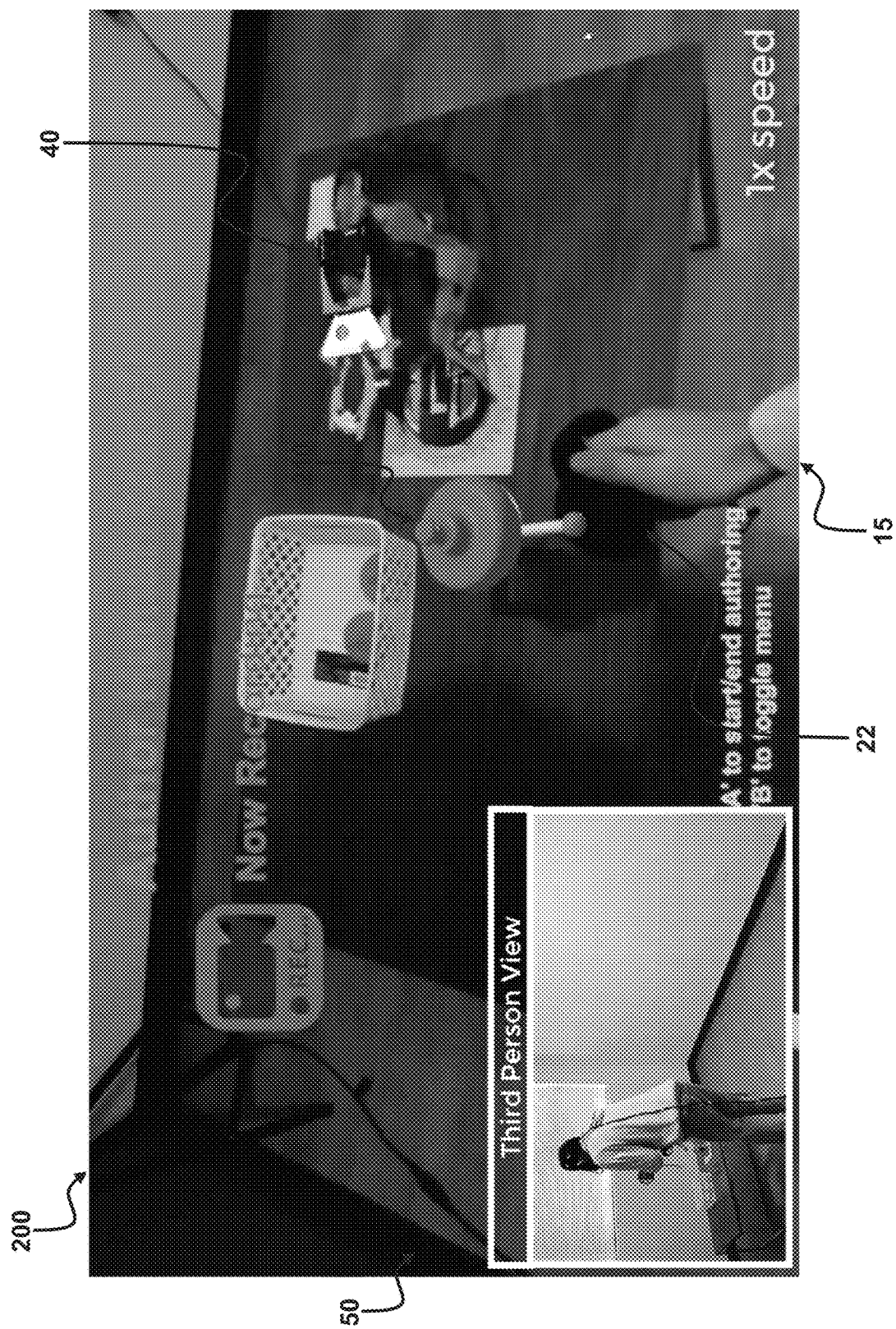
FIG. 5 shows an AR graphical user interface that is provided in a Human Authoring Mode as the user records a Human Motion Clip.

In some embodiments, as the user records the Human Motion Clip, the user may interact with one or more virtual objects that represent real objects that are to be utilized in the HRC task. FIG. 5 shows an AR graphical user interface 200 that is provided on the display screen 28 of the AR system 20 in the Human Authoring Mode as the user records the Human Motion Clip. In the illustrated embodiment, a virtual object 210 is rendered in the AR graphical user interface 200 on the display screen 28 in such a manner that it is superimposed upon the environment 50. The virtual object 210 is a virtual representation of a real object that is to be utilized in the HRC task. The virtual object 210 can be moved or otherwise manipulated by the user by providing inputs via the AR system 20, such as via the user interface 31 of the hand controller(s) 22. For example, to grab the virtual object 210, the user might position a hand controller 22 near the virtual object 210 and press or hold a button of the user interface 31. In some embodiments, the Human Motion Clip may also store position and/or orientation information regarding the virtual object 210 or otherwise store information regarding the interactions between the human collaborator 15 and the virtual object 210.

Once the Human Motion Clip has been recorded, the user can choose to save the Human Motion Clip to a storage device (e.g., the memory 26) via user interactions with the AR graphical user interface. Once the Human Motion Clip is finalized and saved, the AR system 20 will begin operation in the Observation Mode, from which the user can continue the authoring process.

Returning to FIG. 3, in the Observation Mode, the method 100 continues with a step of displaying, in the AR interface, AR ghosts representing the recorded motions of the human collaborator, which are superimposed on the environment (block 110). Particularly, in the Observation Mode, the AR system 20 displays, in the AR graphical user interface on the display 28, a graphical representation of the Human Motion Clip to enable the user to visualize and edit the authored Human Motion Clip. The graphical representation of the Human Motion Clip is superimposed on the environment 50 such that it provides a time-space reference for the human motions of the recorded Human Motion Clip.

Figure 6:
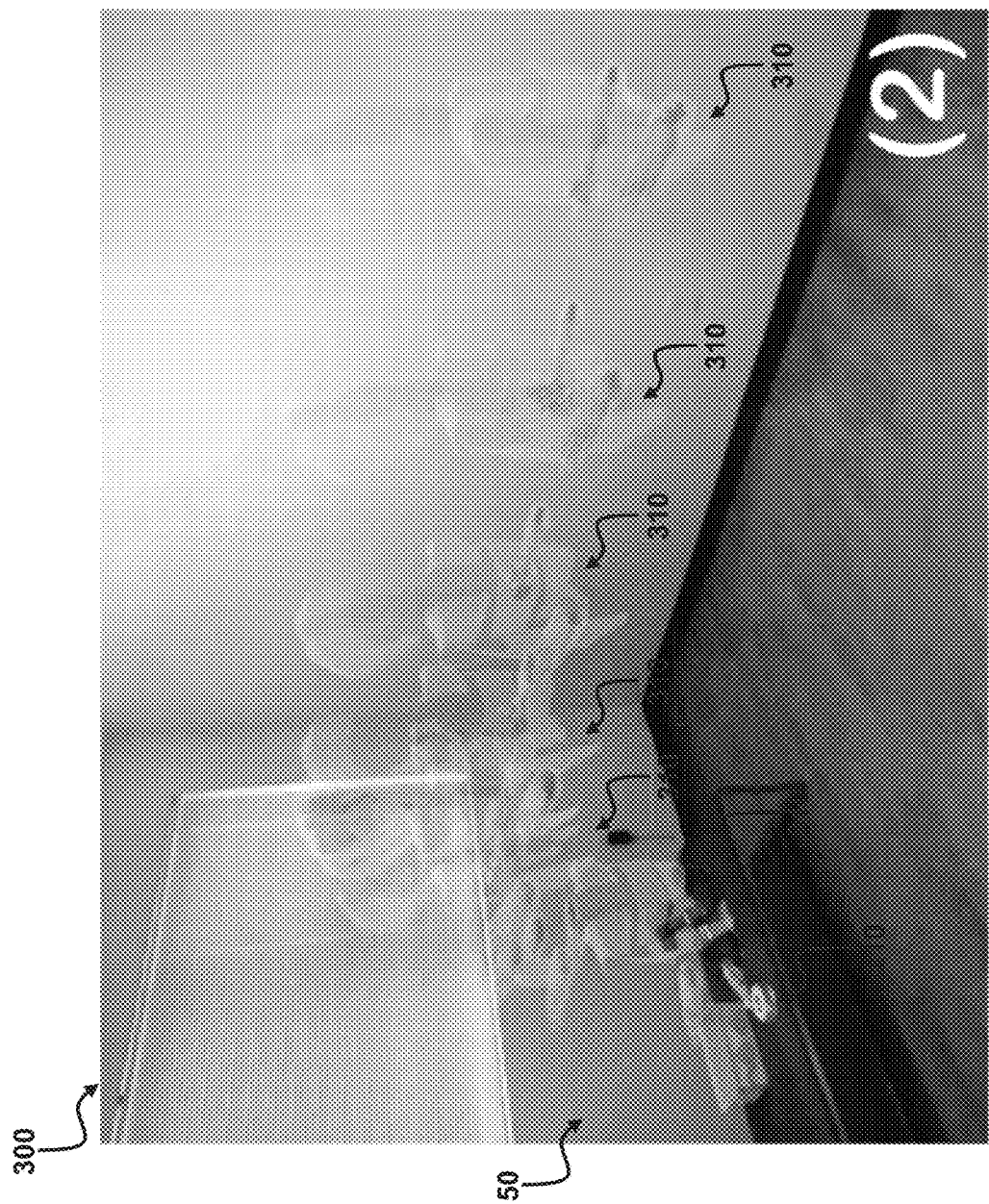
FIG. 6 shows an AR graphical user interface that is provided in an Observation Mode for visualizing the Human Motion Clip.

FIG. 6 shows an AR graphical user interface 300 that is provided on the display screen 28 of the AR system 20 in the Observation Mode for visualizing the Human Motion Clip. The AR graphical user interface 300 includes a graphical representation of the Human Motion Clip that comprises a plurality of AR ghosts 310, which are semi-translucent spatial representations of the human collaborator 15 (e.g., a semi-translucent avatar) at different times of the Human Motion Clip. The plurality of AR ghosts 310 correspond to a representative subset of the motions frames of the Human Motion Clip. Particularly, each AR ghost 310 is superimposed on the environment 50 in accordance with the position and/or orientation information of a respective motion frame in the Human Motion Clip. In other words, each AR ghost 310 is rendered at a position in the AR graphical user interface 300 such that it appears to be located at the position and orientation of the respective motion frame in the Human Motion Clip. Thus, each AR ghost 310 provides a spatial reference of the human motion at that point in time. Moreover, the AR ghosts 310 collectively provide a temporal reference that illustrates the progression of the human motions over time in the Human Motion Clip.

In one embodiment, the user can, via user interactions with the AR graphical user interface, cause the AR graphical user interface 300 to play an animation of the Human Motion Clip in which an AR ghost 310 moves throughout the environment 50 to act out the recorded human motions of the Human Motion Clip in real time.

It will be appreciated by those of ordinary skill in the art that a wide variety of graphical representations other than AR ghosts can be similarly used to provide a time-space reference of the Human Motion Clip in the AR graphical user interface. Likewise, it will be appreciated that that, in many cases, an equivalent non-AR graphical user interface can also be used to provide a graphical representation of the Human Motion Clip, such as a user interface provided on a further computing device such as laptop computer, tablet computer, desktop computer, or a smartphone.

In the Observation Mode, the user can return to the Human Authoring Mode to re-record the Human Motion Clip via user interactions with the AR graphical user interface. Additionally, in some embodiments, the user can add additional motions to the Human Motion Clip via user interactions with the AR graphical user interface. In one embodiment, the user moves to a location in the environment 50 corresponding to the final pose of the Human Motion Clip and then acts out new motions, which are recorded in the same manner as discussed above with respect to the Human Motion Clip. The newly recorded motions are added to the Human Motion Clip, and the AR system 20 returns to the Observation Mode for further review.

Returning to FIG. 3, in the Observation Mode, the method 100 continues with a step of grouping, based on user interactions, the recorded motions into a plurality of recorded motion groups (block 115). Particularly, in the Observation Mode, the AR system 20 groups, based on user interactions, the motion frames of the Human Motion Clip into a plurality of motion groups defining particular segments of the Human Motion Clip. Each motion group corresponds to a set of human motions with respect to which a particular robot collaborator 40 will perform a corresponding action. Thus, as will be discussed in further detail below, respective a Robot Motion Clip will be authored for each motion group of the Human Motion Clip. We denote the human motion frames in a Group $G_i$ as $1_{G_i}$ which is a continuous segment within $L_{record}$.

Figure 7:
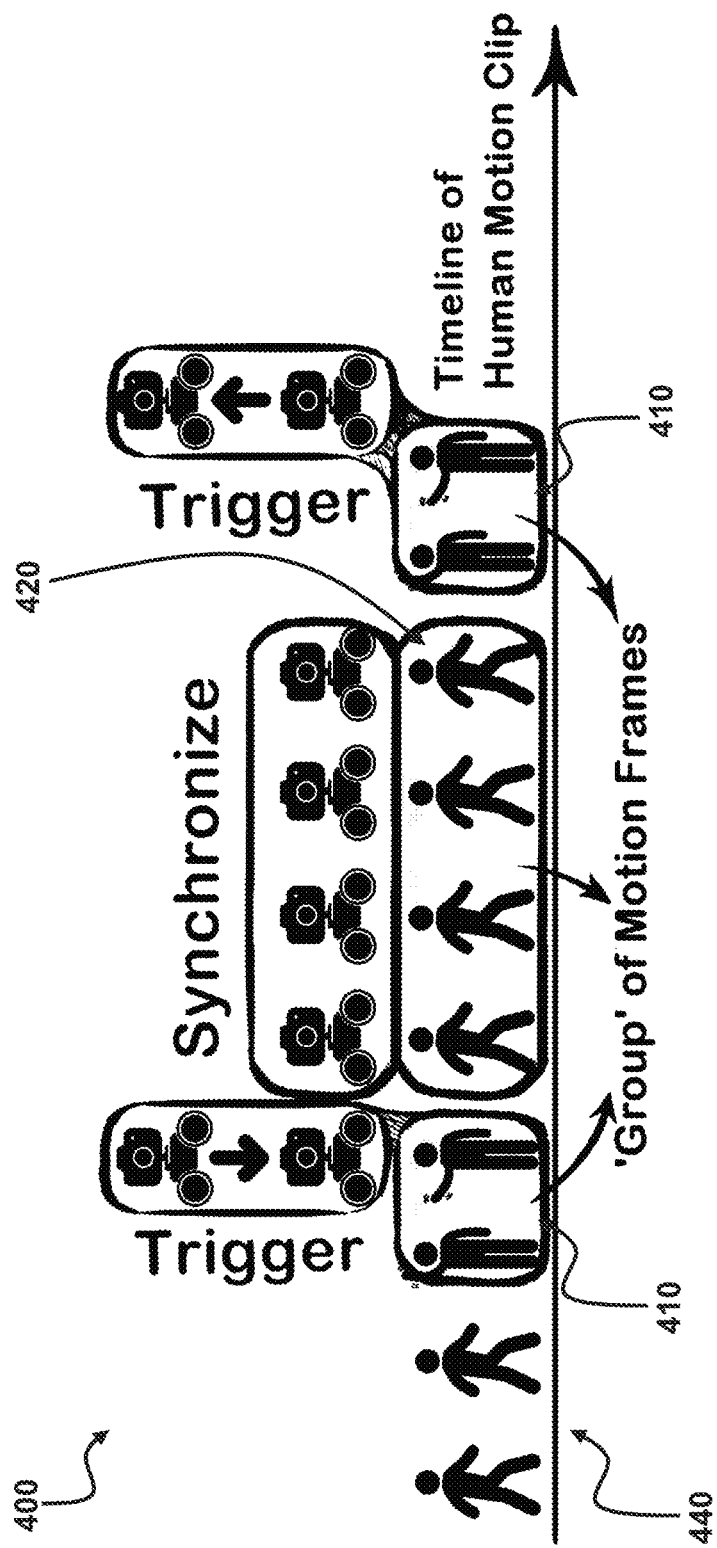
FIG. 7 shows a timeline indicated a grouping of motion frames of an exemplary Human Motion Clip.

For example, FIG. 7 shows a timeline 400 indicating a grouping of motion frames of an exemplary Human Motion Clip. In the illustrated example, the human collaborator 15 performed the following actions: (1) walked for some distance, (2) stopped and waved his or her hand, (3) walked some distance again, and (4) stopped and waved his or her hand again. The HRC task that the user wishes to author involves (a) a robot collaborator 40 (e.g., the robot collaborator 40C, "CamBot") coming over to the human collaborator 15 when he or she first waves, (b) the robot collaborator 40 following the human collaborator 15 and shooting videos as he or she walks, and (c) the robot collaborator 40 leaving the human collaborator 15 when he or she waves again. To achieve this, the user defines a first motion group 410 including the motion frames of the Human Motion Clip in which the human collaborator 15 waves his or hand for the first time. Next, the user defines a second motion group 420 including motion frames of the Human Motion Clip in which the human collaborator 15 walks again after first waving his or her hand. Finally, the user defines a third motion group 430 including the motion frames of the Human Motion Clip in which the human collaborator 15 waves his or hand for the second time. The remaining motion frames that are not intended to correspond to any actions of the robot collaborator 40 are left ungrouped, such as the motions frames 440 corresponding to the human collaborator 15 walking before waving his or her hand for the first time.

Figure 8:
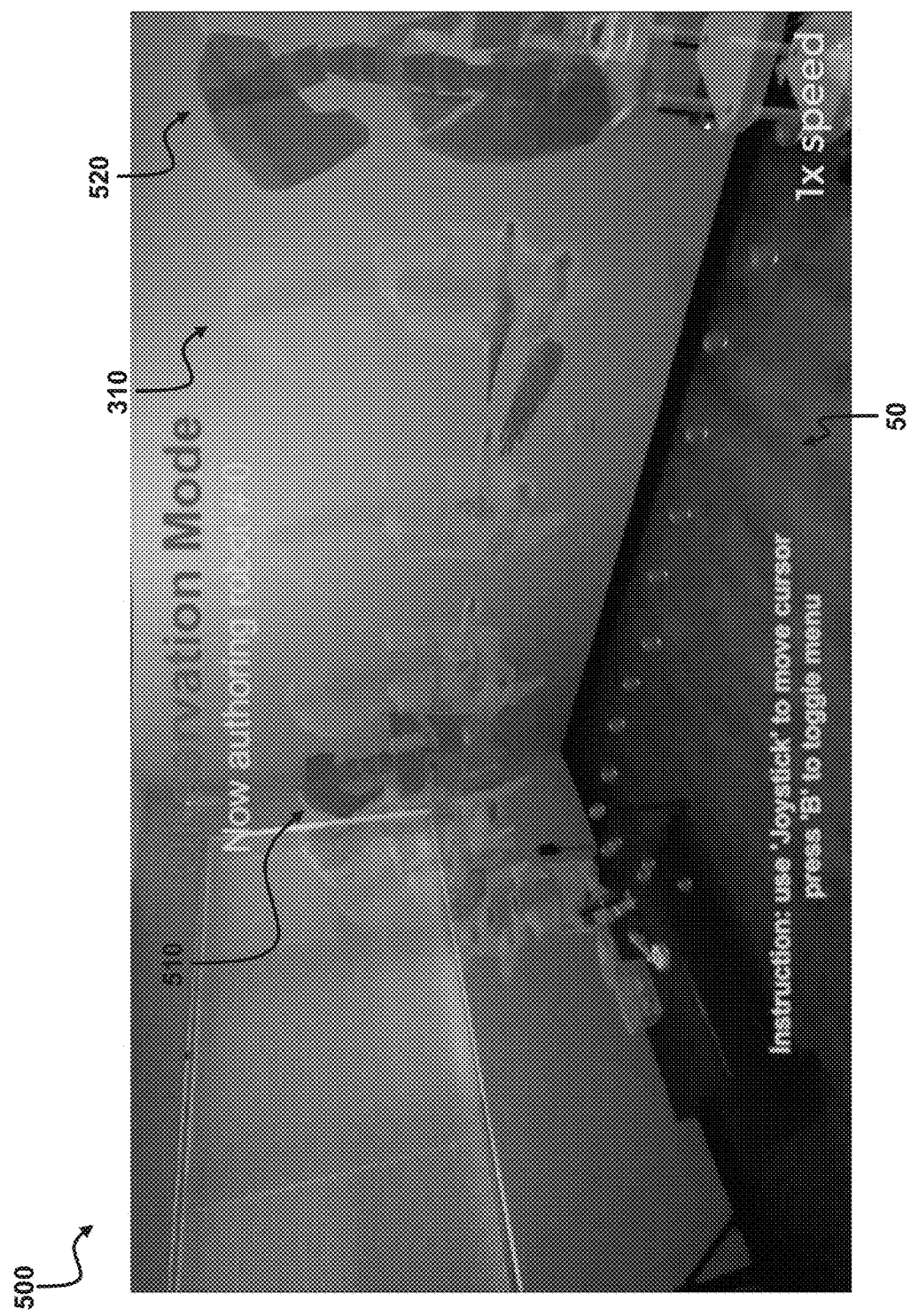
FIG. 8 shows an AR graphical user interface that is provided in the Observation Mode for grouping motion frames of the Human Motion Clip.

FIG. 8 shows an AR graphical user interface 500 that is provided on the display screen 28 of the AR system 20 in the Observation Mode for grouping motion frames of the Human Motion Clip. The AR graphical user interface 500 includes the plurality of AR ghosts 310 representing the Human Motion Clip, in a similar manner to the AR graphical user interface 300 of FIG. 6. The user uses a virtual AR cursor 510, which may be moved using a joystick of the hand-held controller(s) 22 or by pointing the hand-held controller(s) 22. The virtual AR cursor 510 may, for example, be rendered as semi-translucent representation of the human collaborator 15 (e.g., an avatar), much like the AR ghosts 310, which is movable along the path of the Human Motion Clip.

Using the virtual AR cursor 510, the user can perform a variety of operations including grouping motion frames into motion groups, ungrouping motion frames, and trimming motion frames from motion groups. For example, to perform a grouping operation, the user selects a starting point 520 within the Human Motion Clip and drags the virtual AR cursor 510 along the path of the Human Motion Clip to an end point, thereby defining a motion group including the motion frames between the selected starting point 520 and the selected end point. Using similar procedures with the virtual AR cursor 510, the user can also ungroup motion frames and trim motion frames from motion groups.

In one embodiment, in the AR graphical user interface 500, ungrouped AR ghosts 310 are displayed as uncolored or semi-transparent, whereas AR ghosts 310 corresponding to the selected starting point 520 and the selected end point are displayed with a uniquely assigned color for each motion group and with comparatively less transparency. In one embodiment, if the virtual AR cursor 510 is pointing at any AR ghost 310 that is ungrouped, the AR ghost 310 will be highlighted. Otherwise, if the virtual AR cursor 510 is pointing at any AR ghost 310 that is already grouped, the portion of the HRC task of that group will animate repeatedly until the virtual AR cursor 510 is moved away.

It will be appreciated by those of ordinary skill in the art that a wide variety of AR graphical user interfaces and interactive elements can be similarly used to group the motion frames of the Human Motion Clip into a plurality of motion groups. Likewise, it will be appreciated that that, in many cases, an equivalent non-AR graphical user interface can also be used to group the motion frames of the Human Motion Clip into a plurality of motion groups, such as a user interface provided on a further computing device such as laptop computer, tablet computer, desktop computer, or a smartphone.

Returning to FIG. 3, in the Observation Mode, the method 100 continues with a step of designating, based on user interactions, each recorded motion group as one of: a Synchronize task and a Trigger task (block 120). Particularly, in the Observation Mode, the AR system 20 designates, based on user interactions, each individual motion group in the plurality of motion groups of the Human Motion Clip as being one of a plurality of different task types. The task type defines the manner in which the robot collaborator 40 will operate with respect to a human performance of motions corresponding to the particular motion group. In at least one embodiment, each motion group is designated as one of a Synchronize task and a Trigger task.

Particularly, a Synchronize task is a motion group in which the robot collaborator 40 will perform robot motions that take place synchronously with the human performance of motions corresponding to the particular motion group. For a Synchronize task, the robot collaborator 40 will perform corresponding robot motions at a pace that adjusts dynamically to the pace at which the human collaborator 15 performs human motions corresponding to the particular motion group. In other words, the robot collaborator 40 and the human collaborator 15 will each perform their own motions or task, but at a synchronized speed or rate of progress. If the human collaborator 15 moves faster, the robot collaborator 40 will move faster to keep up, and vice versa. Synchronize tasks are useful for collaborations such as joint object manipulation, motion following (e.g., for lighting or camera shooting), and coordinated movements (e.g., hand-shaking).

In contrast, a Trigger task is a motion group in which the robot collaborator 40 will perform robot motions that take after and responsive to the human performance of motions corresponding to the particular motion group. For a Trigger task, the robot collaborator 40 will perform corresponding robot motions right after the human collaborator 15 performs human motions corresponding to the particular motion group. Trigger tasks are useful for collaborations such as sequential joint assembly and gesture signaling (e.g., the human collaborator 15 snaps his or her finger and the robot collaborator 40 starts sweeping the floor).

Returning to the example of FIG. 7, the first motion group 410 in which the human collaborator 15 waves his or hand for the first time is designated a Trigger task because the robot collaborator 40 will come over to the human collaborator 15 after he or she waves his or hand for the first time. The second motion group 420 in in which the human collaborator 15 walks after first waving his or her hand is designated a Synchronize task because the robot collaborator 40 will move side-by-side with the human collaborator 15 to follow him or her. The third motion group 430 in which the human collaborator 15 waves his or hand for the second time is designated a Trigger task because the robot collaborator 40 will move away from the human collaborator 15 after he or she waves his or hand for the second time. The motion frames 440 in which the human collaborator 15 walks prior to waving his or hand for the first time are left ungrouped and are not designated as either a Synchronize task or a Trigger task, because the robot collaborator 40 is not intended to perform any actions.

Figure 9:
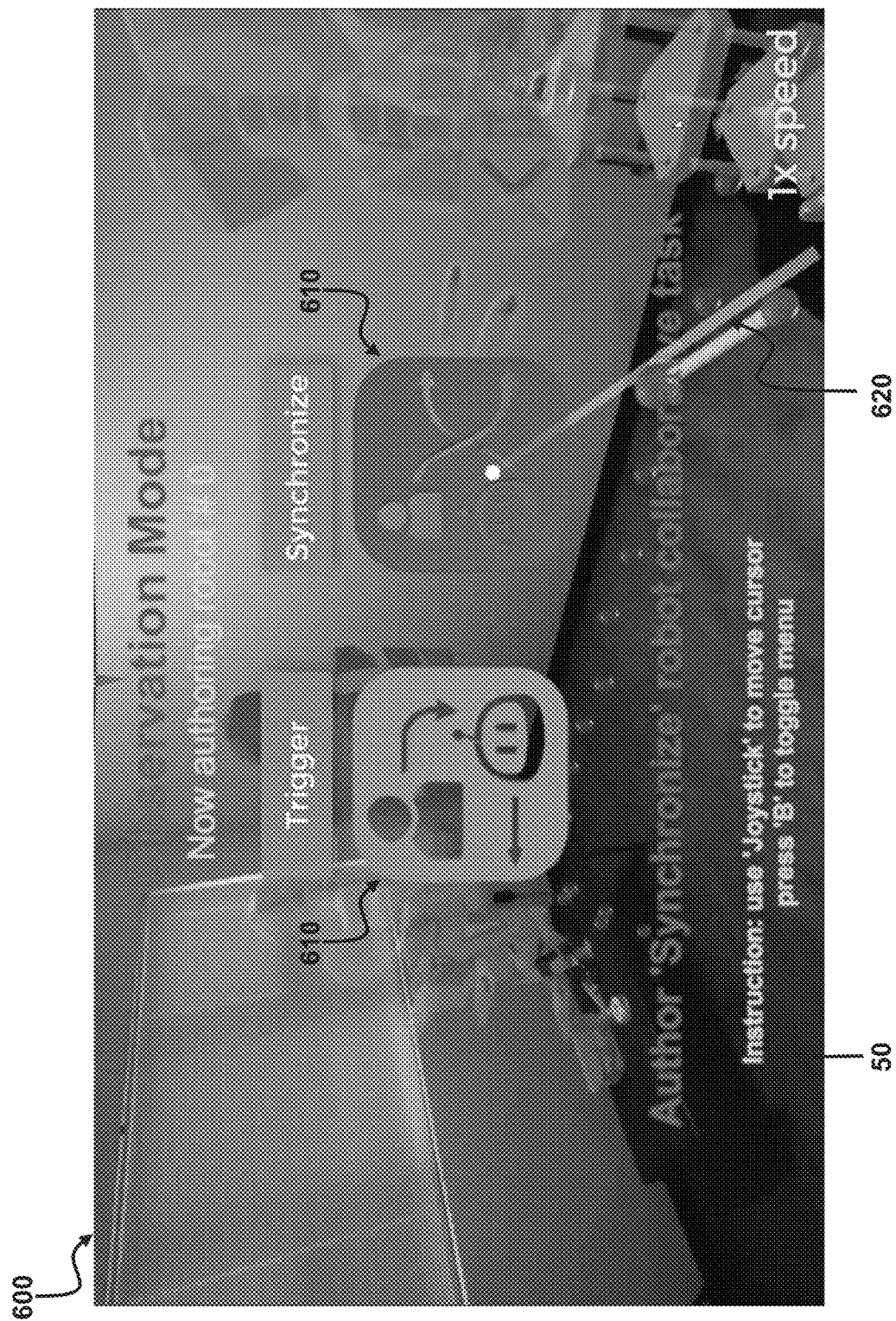
FIG. 9 shows an AR graphical user interface that is provided in the Observation Mode for designating a task type for a motion group of the Human Motion Clip.

FIG. 9 shows an AR graphical user interface 600 that is provided on the display screen 28 of the AR system 20 in the Observation Mode for designating a task type for a motion group of the Human Motion Clip. The AR graphical user interface 600 is provided after a motion group has been defined, for example using the AR graphical user interface 500. The AR graphical user interface 600 is essentially similar to the AR graphical user interface 500 except that it includes selectable options 610 for designated a motion group that has been defined as being either a Synchronize task or a Trigger task. The user uses a virtual cursor 620, which may be moved using a joystick of the hand-held controller(s) 22 or by pointing the hand-held controller(s) 22, to select one of the selectable options 610 to designate the previously defined motion group as one of a Synchronize task (right-most selectable option 610) and a Trigger task (left-most selectable option 610). The motion groups that have already been defined and designated as either a Synchronize task or a Trigger task may be identified with AR graphical user interface 500 with particular colors or icons indicating their type.

It will be appreciated by those of ordinary skill in the art that a wide variety of AR graphical user interfaces and interactive elements can be similarly used to designate each motion group as either a Synchronize task or a Trigger task. Likewise, it will be appreciated that that, in many cases, an equivalent non-AR graphical user interface can also be used to designate each motion group as either a Synchronize task or a Trigger task, such as a user interface provided on a further computing device such as laptop computer, tablet computer, desktop computer, or a smartphone.

The sequence of motion groups, each designated as one of a Synchronize task and a Trigger task, collectively define the HRC Task Sequence for a particular robot collaborator 40. The processes of blocks 115 and/or 120 may be separately performed for each robot collaborator 40 involved in the HRC task. In other words, each robot collaborator 40 works with a common Human Motion Clip, but a different HRC Task Sequence in which each robot collaborator 40 performs different types of tasks and responds to or synchronizes with differently defined motion groups of the Human Motion Clip.

After each motion group is designated as one of a Synchronize task and a Trigger task (or alternatively, once the entire HRC Task Sequence for a particular robot collaborator is finalized and saved), the AR system 20 will begin operation in the Robot Authoring Mode, from which the user can author the robot motions corresponding to each motion group of the HRC Task Sequence.

Returning to FIG. 3, in the Robot Authoring Mode, the method 100 continues with a step of displaying, in the AR interface, a virtual representation of a robot collaborator, which is superimposed in the environment (block 125). Particularly, in the Robot Authoring Mode, the AR system 20 displays, in the AR graphical user interface on the display 28, a virtual representation of the robot collaborator 40, which is superimposed on the environment 50 and which can be manipulated by the user by providing inputs via the AR system 20. In at least some embodiments, the virtual representation of the robot collaborator 40 is superimposed in the environment 50 at a location corresponding to the location of the actual robot collaborator 40 in the environment 50. In some embodiments, the AR system 20 further displays an animated AR avatar that animates the human motions corresponding to the respective motion group of the HRC Task Sequence for which robot motions are being authored. Similarly, in some embodiments, the AR system 20 further displays one or more virtual objects that represent real objects that can be manipulated by the robot collaborator 40 and which are animated according to any previous manipulations by the human collaborator 15 according to the Human Motion Clip.

Figure 10A:
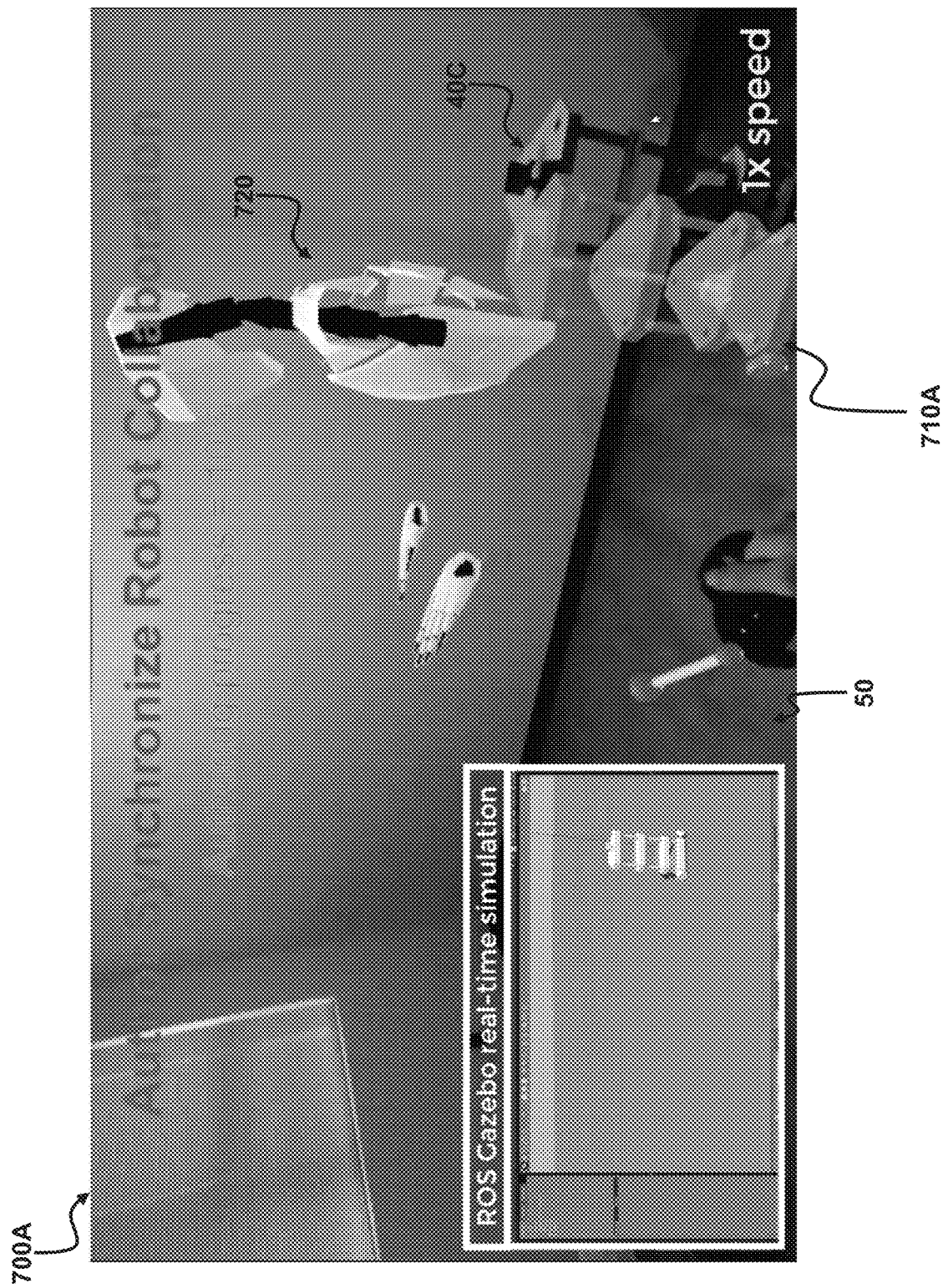
FIG. 10A shows an AR graphical user interface that is provided in the Robot Authoring Mode for authoring robot motions for a Synchronize task.
Figure 10B:
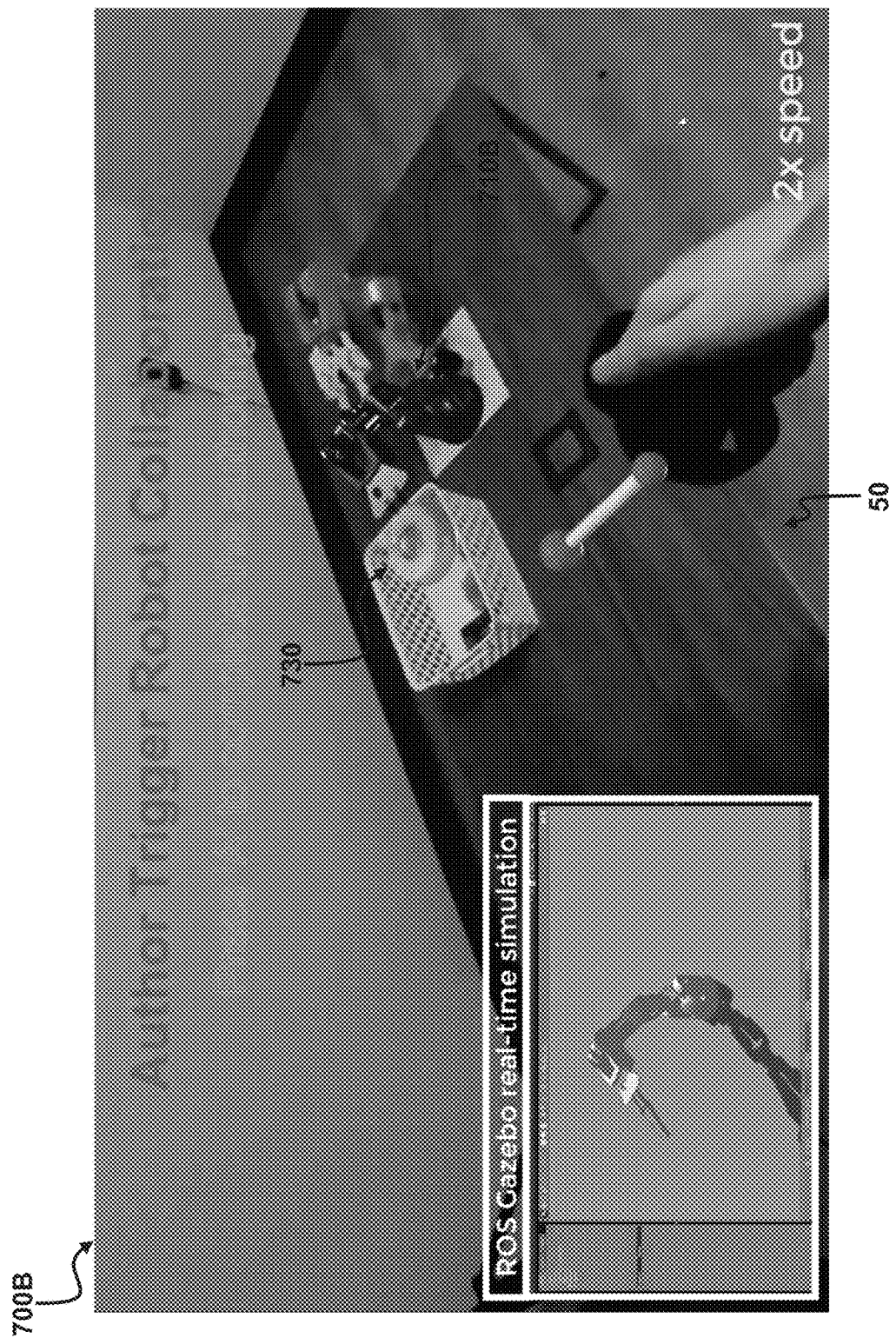
FIG. 10B shows an AR graphical user interface that is provided in the Robot Authoring Mode for authoring robot motions for a Trigger task.

FIG. 10A shows an AR graphical user interface 700A that is provided on the display screen 28 of the AR system 20 in the Robot Authoring Mode for authoring robot motions for a Synchronize task. The AR graphical user interface 700A is provided after designating a motion group as being a Synchronize task. The AR graphical user interface 700A includes a virtual robot 710A which is a virtual representation of the robot collaborator 40C (i.e., the "CamBot"), which is superimposed on the environment 50, initially on top of the robot collaborator 40C. Similarly, FIG. 10B shows an AR graphical user interface 700B that is provided on the display screen 28 of the AR system 20 in the Robot Authoring Mode for authoring robot motions for a Trigger task. The AR graphical user interface 700A is provided after designating a motion group as being a Trigger task. The AR graphical user interface 700B includes a virtual robot 710B which is a virtual representation of the robot collaborator 40A (i.e., the "ArmBot"), which is superimposed on the environment 50, on top of the robot collaborator 40A.

In the example of FIG. 10A, the AR graphical user interface 700A further includes an animated AR avatar 720, which is an animated representation of the human collaborator 15 and is animated to show the human motions corresponding to the respective motion group of the HRC Task Sequence for which robot motions are being authored. In this way, the animated AR avatar 720 acts as a visual reference for authoring the robot motions of the virtual robot 710A for a Synchronize task.

In the example of FIG. 10B, the AR graphical user interface 700B includes a virtual object 730, which is similar to the virtual object 210 and represents a real object that is to be utilized in the HRC task. The virtual object 730 can be moved or otherwise manipulated by indirectly by the user by providing inputs to manipulate the virtual robot 710B. For example, the user can manipulate the arm of virtual robot 710B to grab the virtual object 730, move the virtual object 730 to a new location, and then drop the virtual object 730 at the new location.

The virtual robots 710A, 710B mimic the behavior of the real robot collaborators 40C, 40A, respectively and can be manipulated by the user to role-play robot motions that are to be performed synchronously with or responsive to the human motions corresponding to the respective motion group of the HRC Task Sequence for which robot motions are being authored. In particular, the user moves the virtual robots 710A, 710B to role-play robot motions by providing inputs via the AR system 20, such as via the user interface 31 of the hand controller(s) 22 or by physical movements captured by the sensors 24, 30, 32. The processor 25 receives these user inputs and executes program instructions of the robot simulation engine 35 (e.g., Robot Operating System-Gazebo) to simulate behavior of the corresponding real robot collaborators 40C, 40A. Based on the manipulations received from the user via the hand controllers 22 and sensors 24, 30, 32, the robot simulation engine 35 simulates the motion of the robot under dynamic and physical constraints (maximum torque, speed, acceleration, etc). A simulated status of the virtual robots 710A, 710B is pushed in real-time to the AR graphics engine 34, which is executed by the processor 25 to render the virtual robots 710A, 710B accordingly in the AR graphical user interface 700A, 700B. In this way, user experiences realistic robot manipulation and visualization in the AR graphical user interface 700A, 700B.

Returning to FIG. 3, in the Robot Authoring Mode, the method 100 continues with a step of, for each recorded motion group, determining motions to be performed by the robot collaborator based on manipulations of the virtual representation of the robot that are performed by user interactions (block 130). Particularly, in the Robot Authoring Mode, the AR system 20 determines the sequence of robot motions to be performed by the robot collaborator 40 based on manipulations of the virtual representation of the robot collaborator 40 that are performed by the user by providing inputs via the AR system 20. Particularly, as the user manipulates and controls the virtual robots 710A, 710B to role-play the robot motions of the respective motion group in the HRC Task Sequence, the AR system 20 records these manipulations as a Robot Motion Clip. This approach enables easy programming of a robot collaborator 40 with spatial movements and object interactions while using the animated AR avatar 720 as a time-space reference.

The Robot Motion Clip may take a form that is similar to the Human Motion Clip and, likewise, may comprise a time sequence of motion frames having position and/or orientation information of the robot collaborator 40 at a respective point in time. Particularly, each motion frame may, for example, be in the form of a position vector, which specifies the position and/or orientation of one or more key points of the robot collaborator 40 at the respective point in time. In some embodiments, the Robot Motion Clip may also store position and/or orientation information regarding the virtual object 730 or otherwise store information regarding the interactions between the robot collaborator 40 and the virtual object 730. In one embodiment, the Robot Motion Clip includes motions frames captured at a predetermined capture rate, e.g. 90 Hz. For a Synchronize task, the time-length of the Robot Motion Clip is equal to that of the respective motion group in the HRC Task Sequence. However, for a Trigger task, the Robot Motion Clip may have any time-length.

In the example of FIG. 10A, robot motions for the Synchronize task can be authored during the animation of the animated AR avatar 720. The user can grab the virtual robot 710A and drag it along the floor of the environment 50 to role-play robot motions to be synchronously performed during the respective motion group. Particularly, the user might position a hand controller 22 near the virtual robot 710A and press or hold a button of the user interface 31 to grab the virtual robot 710A. After grabbing the virtual robot 710A, the user can drag the virtual robot 710A to role-play a movement of the virtual robot 710A along the floor of the environment 50, for example to follow the animated AR avatar 720. As the user is authoring robot motions and progressing, the animated AR avatar 720 with the same timestamp will be displayed as time-space reference to assist the user. The user can pause/resume and walk around anytime during the authoring process in order to observe and operate the virtual robot 710A from the optimal perspective.

Similarly, in the example of FIG. 10B, robot motions for the Trigger task can be authored. The user grabs the arm of the virtual robot 710B and moves it to role-play robot motions to be performed in response to the respective motion group. Particularly, the user might position a hand controller 22 near the arm of the virtual robot 710B and press or hold a button of the user interface 31 to grab the arm of the virtual robot 710B. After grabbing the virtual robot 710B, the user can drag the virtual robot 710B to role-play a movement of the arm of the virtual robot 710B. In addition to manipulating the arm of the virtual robot 710B to move, the user can also cause a gripper at the end of the arm of the virtual robot 710B to grab the virtual object 730, for example by pressing a button of the user interface 31 of the hand controller(s) 22.

In at least one embodiment, once the user is finished authoring the robot motions for a respective motion group in the HRC Task Sequence, the virtual robots 710A, 710B, the animated AR avatar 720, and/or the virtual object 730 will animate repeatedly to allow the user to visualize and preview the Robot Motion Clip before the user decides to save or re-record the Robot Motion Clip for the respective motion group in the HRC Task Sequence.

It will be appreciated by those of ordinary skill in the art that a wide variety of AR graphical user interfaces and interactive elements can be similarly used to author robot motions for a respective motion group in the HRC Task Sequence. Likewise, it will be appreciated that that, in many cases, an equivalent non-AR graphical user interface can also be used to author robot motions for a respective motion group in the HRC Task Sequence, such as a user interface provided on a further computing device such as laptop computer, tablet computer, desktop computer, or a smartphone.

Once the Robot Motion Clip has been recorded, the user can choose to save the Robot Motion Clip to a storage device (e.g., the memory 26) via user interactions with the AR graphical user interface. Once the Robot Motion Clip is finalized and saved, the AR system 20 will return to operation in the Observation Mode, from which the user can continue editing the motion groups and, ultimately, record a Robot Motion Clip for each motion group in the HRC Task Sequence.

Returning to FIG. 3, in the Observation Mode, the method 100 continues with a step of displaying, in the AR interface, AR ghosts representing the motions to be performed by the robot collaborator, which are superimposed on the environment (block 135). Particularly, in the Observation Mode, the AR system 20 displays, in the AR graphical user interface on the display 28, a graphical representation of the Robot Motion Clip to enable the user to visualize and edit the authored Robot Motion Clip. The graphical representation of the Robot Motion Clip is superimposed on the environment 50 such that it provides a time-space reference for the robot motions of the recorded Robot Motion Clip.

Figure 11:
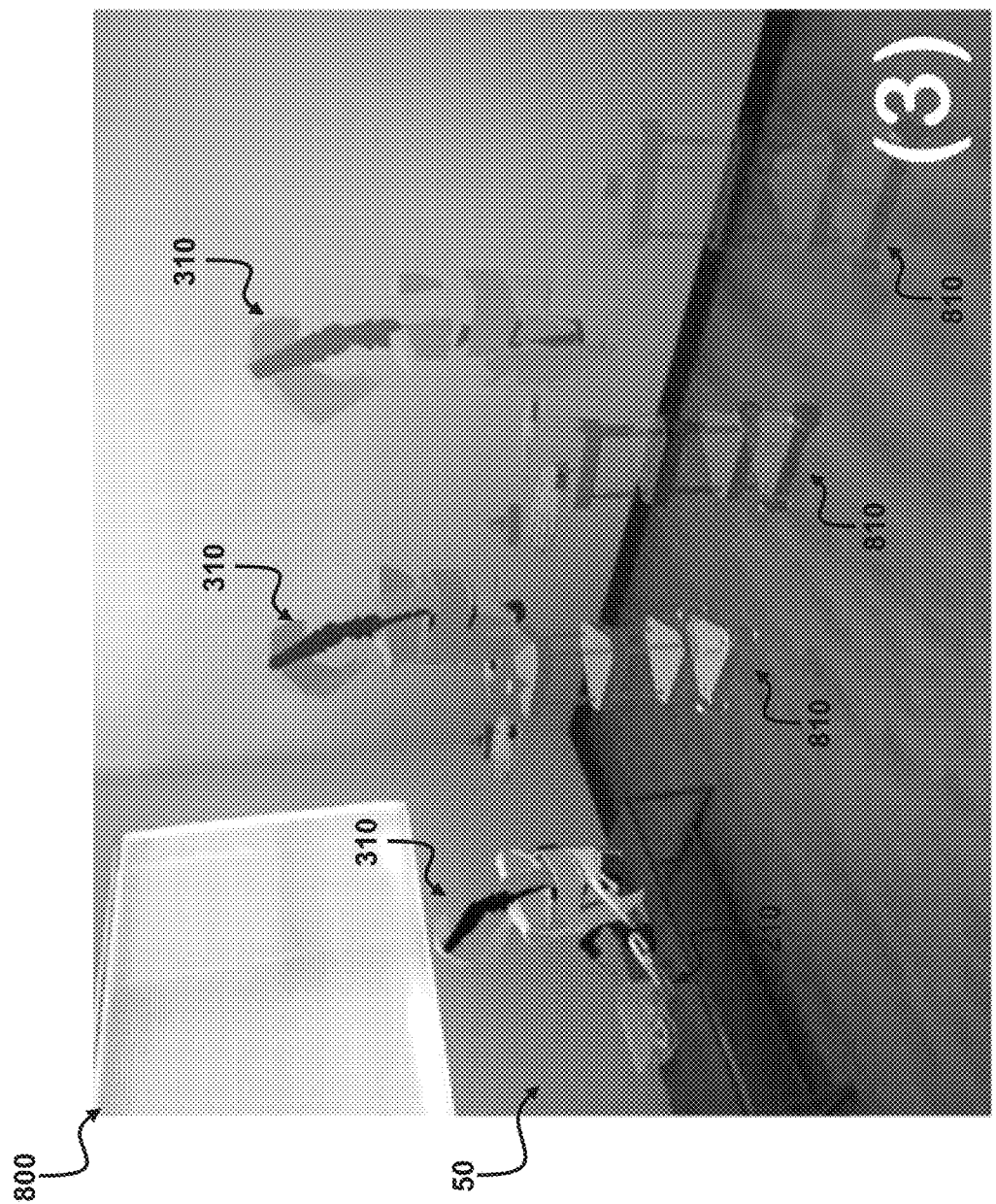
FIG. 11 shows an AR graphical user interface that is provided in the Observation Mode for visualizing the authored Human Motion Clip and Robot Motion Clips.

FIG. 11 shows an AR graphical user interface 800 that is provided on the display screen 28 of the AR system 20 in the Observation Mode for visualizing the authored Human Motion Clip and Robot Motion Clips. The AR graphical user interface 800 is similar to AR graphical user interface 300 and similarly includes the plurality of AR ghosts 310 representing the Human Motion Clip and the virtual object 210 representing a real object that is to be utilized in the HRC task. The AR graphical user interface 800 further includes a graphical representation of the Robot Motion Clip that comprises a plurality of AR ghosts 810, which are semi-translucent representations of the robot collaborator 40C (e.g., the "CamBot") at different times of the Robot Motion Clip. The plurality of AR ghosts 810 correspond to a representative subset of the motions frames of the Robot Motion Clip. Each AR ghost 810 is superimposed on the environment 50 in accordance with on the position and/or orientation information of a respective motion frame in the Robot Motion Clip. In this way, the AR system 20 provides the user with a time-space visualization of both the Human Motion Clip and each respective Robot Motion Clip in the HRC Task Sequence.

It will be appreciated by those of ordinary skill in the art that a wide variety of graphical representations other than AR ghosts can be similarly used to provide graphical representation of the Robot Motion Clip. Likewise, it will be appreciated that that, in many cases, an equivalent non-AR graphical user interface can also be used to provide a graphical representation of the Robot Motion Clip, such as a user interface provided on a further computing device such as laptop computer, tablet computer, desktop computer, or a smartphone.

In the Observation Mode, the user can choose to enter Preview Mode to visualize the entire HRC task with an animation of the Human Motion Clip and each Robot Motion Clip that has been recorded.

Returning to FIG. 3, in the Preview Mode, the method 100 continues with a step of displaying, in the AR interface, a preview of human-robots collaborative task including animated AR ghosts (block 140). Particularly, in the Preview Mode, the AR system 20 displays, in the AR graphical user interface on the display 28, a preview of the HRC task including animated AR avatars or AR ghosts that animate the collaborative motions of the human collaborator 15 and of the robot collaborator(s) 40. The AR graphical user interface that is provided in the Preview Mode is essentially similar to the AR graphical user interface 800 except that, rather than displaying static AR ghosts, the AR system 20 displays animated AR avatar(s) representing the human collaborator(s) 15 that animate the human motions of Human Motion Clip(s) and virtual robot(s) representing the robot collaborator(s) 40 that animate the robot motions of each Robot Motion Clip, according to the HRC Task Sequence.

Figure 12:
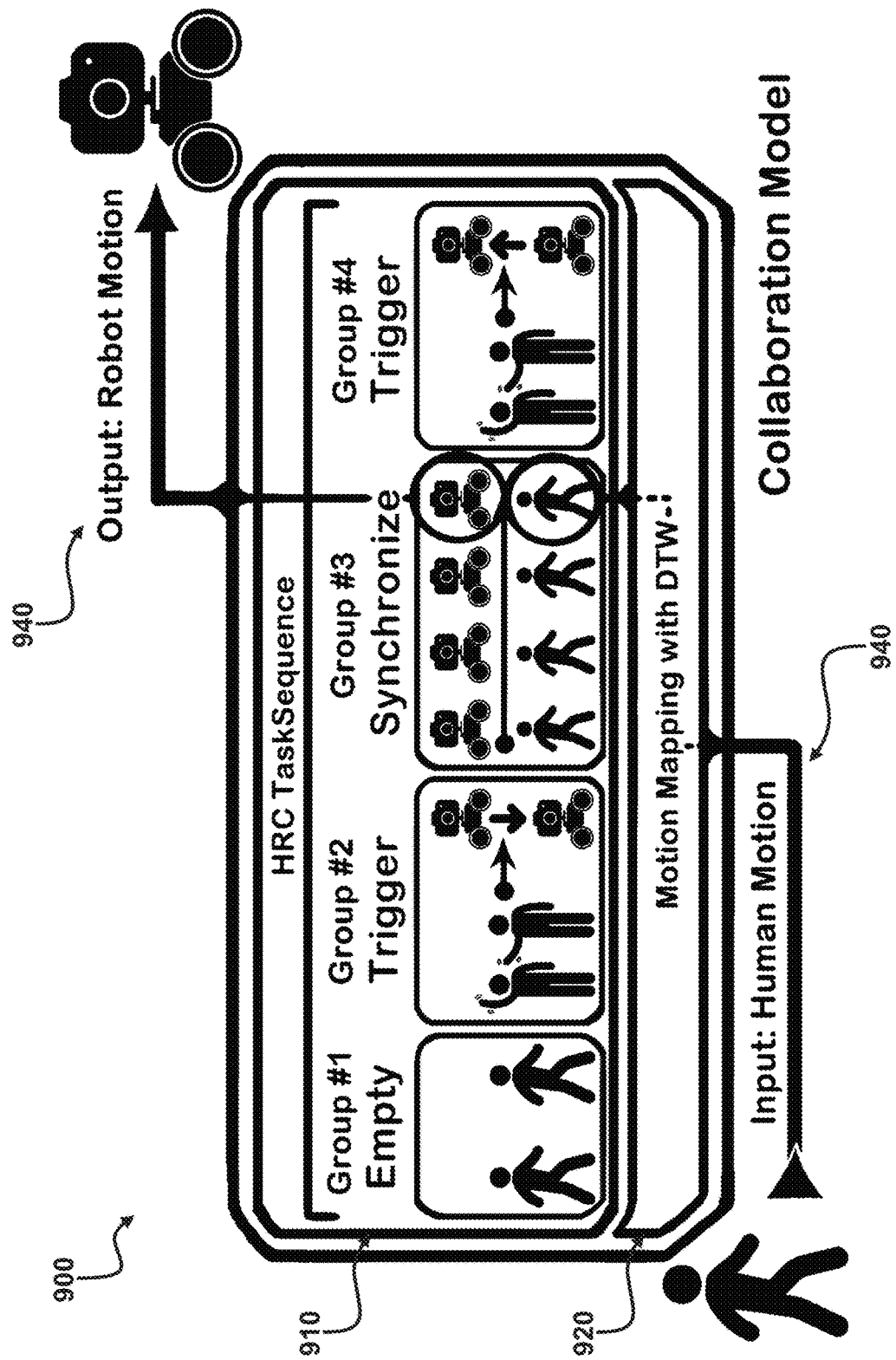
FIG. 12 shows a collaboration model used by the AR system in the Action Mode.

Once the user is satisfied with the authored task, he or she can take on the role of a human collaborator 15 and act out the authored HRC tasks by entering the Action Mode. FIG. 12 shows a collaboration model 900 used by the AR system 20 in the Action Mode. The collaboration model 900 consists of the user-generated HRC Task Sequence 910 and a motion mapping algorithm 920. The HRC Task Sequence 910 comprises the Human Motion Clip, which has been grouped into motion groups of particular types, and the Robot Motion Clips have been recorded for the motion groups. The motion mapping algorithm 920 maps input human motions 930 to a respective motion frame or timestamp of the HRC Task Sequence 910. Based on the progression of the input human motions 930 through the HRC Task Sequence 910, output robot motions 940 are commanded by the AR system 20 based on the recorded Robot Motion Clips.

Figure 13:
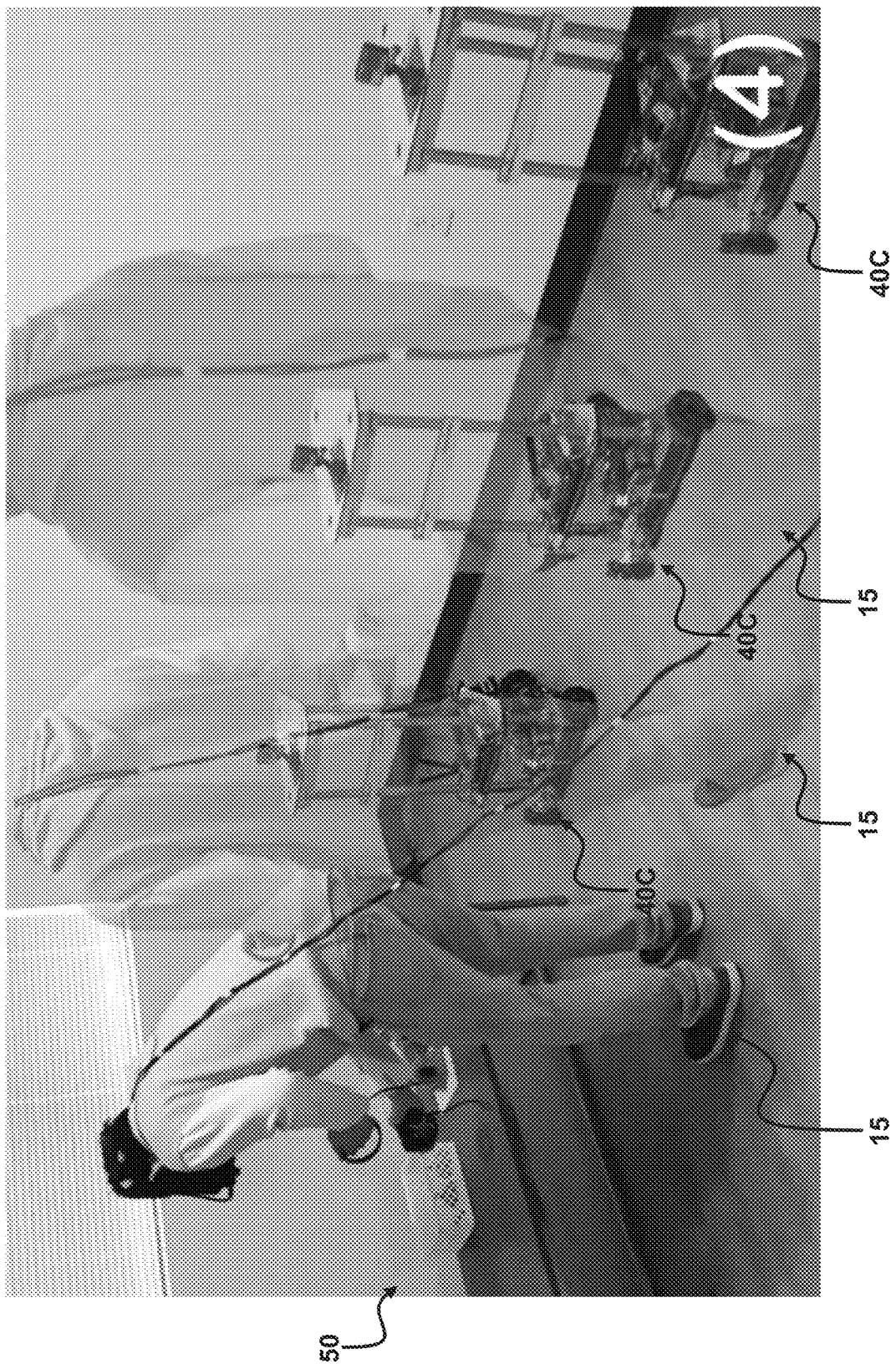
FIG. 13 shows a performance of the HRC task by a human collaborator with a robot collaborator.

With continued reference to FIG. 3, in the Action Mode, the method 100 continues with a step of detecting performance of motions corresponding to each of the plurality of recorded motion groups (block 140). Particularly, in the Action Mode, the AR system 20 detects performance of human motions corresponding to the Human Motion Clip, including human motions corresponding to each particularly motion group with respect to which a Robot Motion Clip was recorded. As illustrated in FIG. 13, the human collaborator moves throughout the environment 50 during the course of performing the human actions required for the HRC task, in the same manner as when the Human Motion Clip was recorded (as seen in FIG. 4). As the human collaborator 15 moves throughout the environment 50 to perform the human actions required for the HRC task, the AR system 20 detects the human motions of the human collaborator 15 and maps the human motions to a matching timestamp or motion frame of the Human Motion Clip.

In order to perform the HRC task, the human collaborator must repeat the human actions that were recorded in the Human Motion Clip. The AR system 20 captures these motions using any suitable combination of the external sensor 24, the sensors 30, the sensor 32, the sensors 46, and the camera 29 and determines, in real-time, the position and orientation of the human collaborator 15. Using the motion mapping algorithm, the AR system 20 continuously estimates a progress of the human collaborator 15 through the Human Motion Clip, including progress through any ungrouped motion frames. If the human collaborator 15 has reached a motion group designated as a Synchronize task, then the AR system 20 continuously estimates a progress of the human collaborator 15 through performing the human motions of the motion group designated as a Synchronize task. If the human collaborator 15 has reached a motion group designated as a Trigger task, then the AR system 20 detects when the human collaborator 15 has completely performed the human motions of the motion group designated as a Synchronize task.

As discussed above with respect to the recording of the Human Motion Clip, each Human Motion Clip comprises an $\mathbb{R}^9$ curve in the form of:

$$L_{record} = [v_1, v_2, v_3, \ldots, v_N].$$

Moreover, the subset of motion frames v of each defined motion group $G_i$ are denoted $1_{G_i}$, which is a continuous segment within $L_{record}$.

Finally, the status of the human collaborator 15 (i.e., position and/or pose) at a motion frame $v_{t_i}$ at the particular time $t_i$ is represented by an $\mathbb{R}^9$ vector in the form of:

$$v_{t_i} = [x_{t_i}^{head}, y_{t_i}^{head}, z_{t_i}^{head}, x_{t_i}^{left}, y_{t_i}^{left}, z_{t_i}^{left}, x_{t_i}^{right}, y_{t_i}^{right}, z_{t_i}^{right}]^T.$$

Thus, the current status of the human collaborator 15 while performing the HRC task can be similarly represented using the same nine degrees of freedom (i.e., the three translational axes for each of the head, left hand, and right hand) in the form of in the form of:

$$v_{t_{now}} = [x_{t_{now}}^{head}, y_{t_{now}}^{head}, z_{t_{now}}^{head}, x_{t_{now}}^{left}, y_{t_{now}}^{left}, z_{t_{now}}^{left}, x_{t_{now}}^{right}, y_{t_{now}}^{right}, z_{t_{now}}^{right}]^T,$$

Moreover, the recorded real-time motions of the human collaborator 15 can be represented in the form:

$$L_{realtime} = [v_1, \ldots, v_{t_{now}-1}, v_{t_{now}}].$$

In one embodiment, the AR system 20 is configured to determine a projected curve $f_{G_i}$ and a projection matrix $P_{G_i}$ for each motion group $G_i$ of the Human Motion Clip and/or HRC Task Sequence. The projected curve $f_{G_i}$ and a projection matrix $P_{G_i}$ are derived as according to Algorithm 1, shown in FIG. 14. Particularly, using Algorithm 1, the AR system 20 applies principal component analysis (PCA) to project the $\mathbb{R}^9$ curve of the raw motion data $l_{G_i}$ for each motion group $G_i$ onto a $\mathbb{R}^2$ plane. This has advantageously the effect of reducing the degrees of freedom of the inputs, while keeping the most relevant information from the raw gesture data $l_{G_i}$ for each motion group $G_i$.

If the human collaborator 15 has progressed to a motion group $G_i$ that is designated as a Trigger task, the AR system 20 must determine whether the human collaborator 15 has finished performing the corresponding human motions $l_{G_i}$ of the motion group $G_i$. To this end, the AR system 20 detects the human motions that the human collaborator 15 has just performed: $l_{realtime} = [v_{t_{now}-n+1}, \ldots, v_{t_{now}-1}, v_{t_{now}}]$ where n is the length of $l_{G_i}$. Next, the AR system 20 determines the projected curve $f_{realtime} = P_{G_i} l_{realtime}$ and compares it with the projected curve $f_{G_i}$ for the Group $G_i$.

In one embodiment, the AR system 20 uses Dynamic Time Warping (DTW) to calculate the similarity between $f_{realtime}$ and the projected curve $f_{G_i}$ for the Group $G_i$. It will be appreciated by those of ordinary skill in the art that DTW is an algorithm to find the alignment between two time series data. Given two time series $s = [s_1, s_2, \ldots, s_n]$ and $t = [t_1, t_2, \ldots, t_m]$ with length n and m, a distance matrix D is calculated using Algorithm 2, shown in FIG. 15. Each element D[i, j] in the distance matrix D is the distance between s[1:i] and t[1:j] with best alignment. D[n, m] is defined as the DTW distance between s and t, denoted as <s, t>. As applied to the disclosure, the AR system 20 determines that human collaborator 15 finishes performing $G_i$ at the current time if $<f_{realtime}, f_{G_i}>$ reaches its global minimum. However, the future behavior of the human collaborator 15 is unavailable, so it is hard to identify when the global minimum is achieved. To this end, the AR system 20 uses a threshold $\varepsilon$ to conclude a global minimum given the existing behaviors of the human collaborator 15. In other words, if $<f_{realtime}, f_{G_i}>$ reaches a local minimum and this minimum value is smaller than $\varepsilon$, the AR system 20 determines that this minimum value is the global value and reports that human performance corresponding to the motion group $G_i$ is completed by the human collaborator 15. To adapt this threshold for different $f_{G_i}$ with various lengths, the AR system 20 sets $\varepsilon = \alpha \ast n$ where a is $\alpha$ fixed coefficient.

If the human collaborator 15 has progressed to a motion group $G_i$ that is designated as a Synchronize task, the AR system 20 must detect a progress (0%~100%) of the performance of the human motions $l_{G_i}$ of the motion group $G_i$, so that the robot collaborator 40 can synchronize its progression of the collaborative robot actions. To this end, the AR system 20 compares the real time data $l_{realtime} = [v_{t_{start}}, \ldots, v_{t_{now}-1}, v_{t_{now}}]$ with the subsequence of $l_{G_i}: l_{G_i}[1], l_{G_i}[1:2], \ldots, l_{G_i}[1:n]$, where $t_{start}$ is the time when $G_i$ is reached by the human collaborator 15. The AR system 20 derives the progress of the human collaborator 15 as n*/n if the sub-sequence $l_{G_i}: [1:n^*]$ approximates $l_{realtime}$ the most. In other words, the AR system 20 first projects $l_{realtime}$ to $f_{realtime}$ using $P_{G_i}$ and calculates the DTW distances between $f_{realtime}$ and the sub-sequences of $f_{G_i}: f_{G_i}[1], f_{G_i}[1:2], \ldots, f_{G_i}[1:n]$, denoted as $d_1, d_2, \ldots, d_n$. Next, the AR system 20 determines $n^* = \operatorname{argmin}_{1 \leq i \leq n}(d_i)$. However, it will be appreciated that the scale of $d_i$ is influenced by the length of the sub-sequence $f_{G_i}: [1:i]$. To eliminate this influence, a modified DTW distance $d'_i = d_i/\sqrt{i}$ (i=1,2, \ldots, n) is introduced. Then, the AR system 20 determines a sub-sequence $f_{G_i}: [1:n^*]$ that is best aligned with $f_{realtime}$ while n* is given by $n^* = \operatorname{argmin}_{1 \leq i \leq n}(d'_i)$, and thus the progress of the human collaborator 15 is n*/n. It will be appreciated that, in the DTW distance matrix D, the values $d_1, d_2, \ldots, d_n$ are the last row of D, so in practice, the AR system 20 may calculate D and n* iteratively using Algorithm 3, shown in FIG. 16.

Returning to FIG. 3, in the Action Mode, the method 100 continues with a step of, for each recorded motion group, generate and transmit to the robot commands configured to operate the robot to perform the corresponding motions in synchronization with or responsive to the performance of the respective recorded motion group (block 150). Particularly, in the Action Mode, for each motion group $G_i$, the AR system 20 generates, and transmits to the respective robot collaborator 40 (e.g., by operating the WiFi modules 27, 48), at least one command configured to operate the robot collaborator 40 to perform the robot motions according the respective Robot Motion Clip that corresponds to the respective motion group $G_i$ that is being performed. In the example illustrated in FIG. 13, the robot collaborator 40C (e.g., the "CamBot") is operated to follow the human collaborator 15 and film a video as he walks to toward the table.

If the human collaborator 15 has progressed to a motion group $G_i$ that is designated as a Trigger task, the AR system 20 transmits commands to the robot collaborator 40 to perform the robot motions according the respective Robot Motion Clip in response to determining that the human collaborator 15 has completed performing the corresponding human motions $l_{G_i}$ of the motion group $G_i$.

Similarly, if the human collaborator 15 has progressed to a motion group $G_i$ that is designated as a Synchronize task, the AR system 20 transmits commands to the robot collaborator 40 to perform the robot motions according the respective Robot Motion Clip in synchronization with the determined progress n*/n of the human collaborator 15 in performing the corresponding human motions $l_{G_i}$ of the motion group $G_i$. In other words, the AR system 20 transmits commands to the robot collaborator 40 to perform robot motions at a timestamp of the respective Robot Motion Clip corresponding to the determined progress n*/n.

In at least one embodiment, during performance of the HRC task by the human collaborator 15, the AR system 20 provides an AR graphical user interface on the display 28 that includes one or more visual aids the assist the user in performing the correct motions to complete the HRC task and to alleviate the mental burden of memorization.

Figure 17:
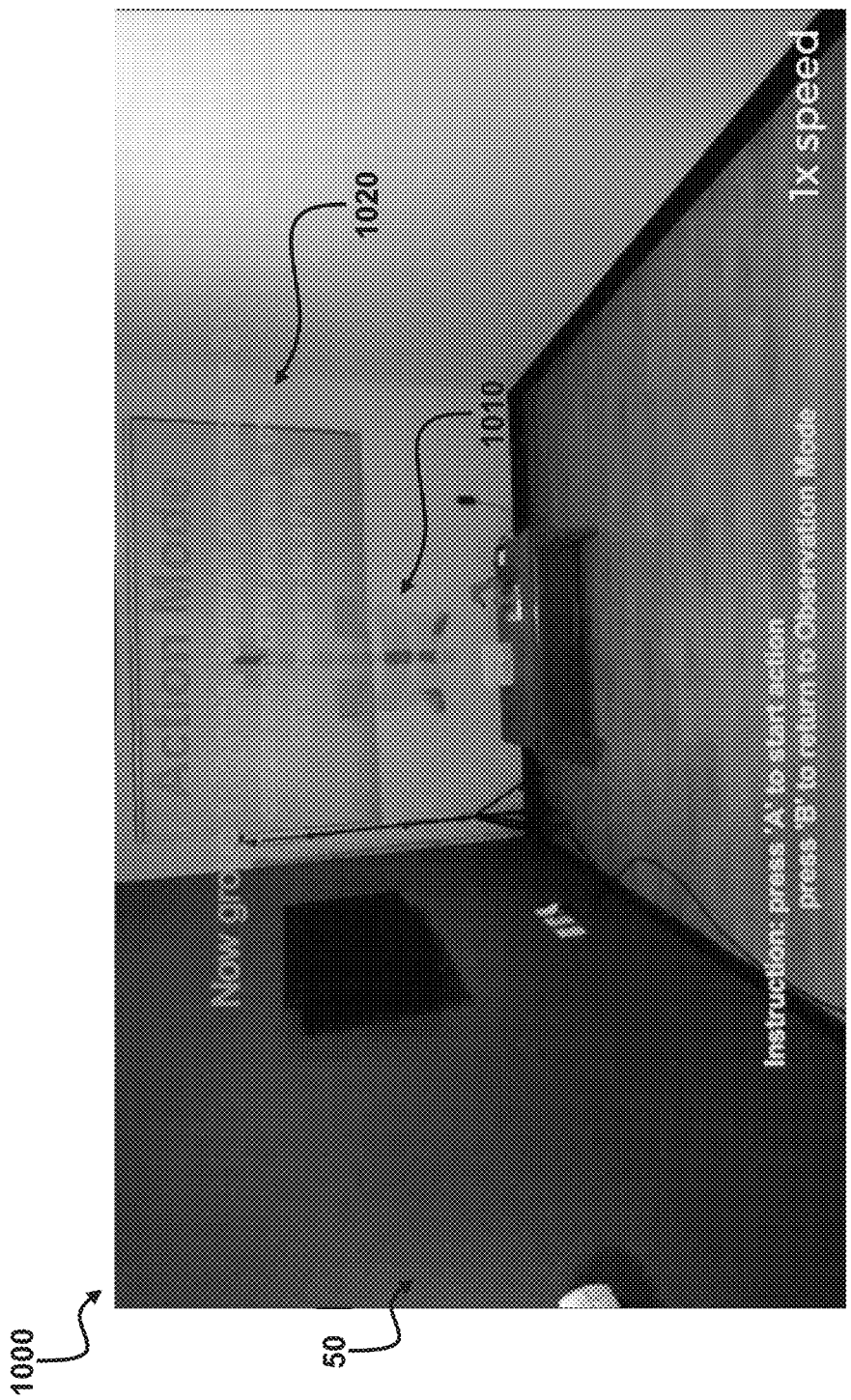
FIG. 17 shows an AR graphical user interface in the Action Mode for visually aiding the human collaborator in performing the HRC task.

FIG. 17 shows an AR graphical user interface 1000 that is provided on the display screen 28 of the AR system 20 in the Action Mode for visually aiding the human collaborator 15 in performing the HRC task. The AR graphical user interface 1000 includes a graphical representation of at least a portion of the Human Motion Clip, in particular a portion of the Human Motion Clip that has not yet been performed or is to be performed next by the human collaborator 15. In the illustrated embodiment, the graphical representation takes the form of an animated AR avatar 1010, which is an animated representation of the human collaborator 15 and is animated to show the human motions corresponding to the respective motion group of the HRC Task Sequence that the human collaborator 15 is to perform next (e.g., walk to a table). In the illustrated embodiment, a numerical progress 1020 is also displayed that indicates a progress of the human collaborator 15.

In some embodiments, the animated AR avatar 1010 may animate an all of the motions of the Human Motion Clip, rather than only the next motions to be performed. In some embodiments, further graphical representations of the Human Motion Clip can be displayed, such as a dotted line indicating a path of the Human Motion Clip. Moreover, in some embodiments, graphical representations of the Robot Motion Clip can be displayed, such as an animated virtual robot representing the robot collaborator or a dotted line indicating an intended path for the robot collaborator 40.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for authoring a human-robot collaborative task in which a robot collaborates with a human, the method comprising:
   recording, with at least one sensor, during a first time period, human motions of a human as the human demonstrates the human-robot collaborative task in an environment, the recorded human motions including a plurality of recorded positions of the human in the environment over a period of time;
   displaying, on a display, during a second time period that is subsequent to the first time period, an augmented reality graphical user interface including a graphical representation of the recorded human motions that is superimposed on the environment such that the graphical representation appears within the environment at the plurality of recorded positions of the human in the environment;
   displaying, in the graphical user interface on the display, during the second time period while the graphical representation of the recorded human motions is displayed, a virtual representation of the robot that is superimposed on the environment and which can be manipulated by the human by providing user inputs;
   receiving, via a user interface, during the second time period, user inputs defining manipulations of the virtual representation of the robot, the manipulations being graphically represented by the virtual representation of the robot;
   determining, with a processor, during the second time period, a sequence of robot motions to be performed by a robot in concert with a performance of human motions that match the recorded human motions, based on the manipulations of the virtual representation of the robot;
   storing, in a memory, during the second time period, the recorded human motions and the sequence of robot motions to be performed by the robot;
   detecting, during a third time period that is subsequent to the second time period, the performance of human motions that match the recorded human motions by one of the human and a further human, the detecting including (i) recording, with the at least one sensor, a real-time position of the one of the human and the further human and (ii) comparing, with the processor, the real-time position to the plurality of recorded positions of the human in the recorded human motions; and
   generating, with the processor, and transmitting to the robot, with a transceiver, during the third time period, a plurality of commands configured to operate the robot to perform the sequence of robot motions in concert with the performance of the human motions that match the recorded human motions.

2. The method of claim 1 further comprising:
   during the performance of human motions that match the recorded human motions by the one of (i) the human and (ii) the further human:
      displaying, in the graphical user interface on the display, a virtual representation of a portion of the recorded human motions that have not yet been performed by the one of (i) the human and (ii) the further human, which is superimposed on the environment based on the plurality of recorded positions of the human in the environment.

3. The method of claim 1, the recording the human motions further comprising:
   displaying, in the graphical user interface on the display, a virtual representation of an object that is superimposed on the environment and which can be manipulated by the human by providing user inputs; and
   recording, with the at least one sensor, the human motions of the human as the human demonstrates the human-robot collaborative task in the environment, the recorded human motions including the plurality of recorded positions of the human in the environment over the period of time and manipulations of the virtual representation of the object that are performed by the human by providing user inputs during the period of time.

4. The method of claim 1, the determining the sequence of robot motions to be performed by the robot further comprising:
   displaying, in the graphical user interface on the display, a virtual representation of an object, which is superimposed on the environment and which can be manipulated by the virtual representation of the robot by the human by providing user inputs,
   wherein the sequence of robot motions include manipulations to be performed of a real-world object corresponding to the virtual representation of the object.

5. The method of claim 1 further comprising:
   grouping, with a processor, respective subsets of the recorded human motions into a plurality of motion groups based on user inputs received from the human; and
   determining, with the processor, based on user inputs received from the human, for each respective motion group of the plurality of motion groups, a respective set of robot motions to be performed by the robot in concert with a performance of human motions that match the respective motion group,
   wherein the sequence of robot motions to be performed by the robot is formed by the set of robot motions to be performed by the robot for each of the plurality of motion groups.

6. The method of claim 5 further comprising:
   receiving, for each respective motion group of the plurality of motion groups, a user input from the human designating the respective motion group as one of:

(i) a first type in which the corresponding set of robot motions is to be performed by the robot in synchronization with a progress of a performance of human motions that match the respective motion group; and
(ii) a second type in which the corresponding set of robot motions is to be performed by the robot responsive to a completion of a performance of human motions that match the respective motion group.

7. The method of claim 6 further comprising:
detecting, with the at least one sensor, a plurality of real-time positions of one of (i) the human and (ii) a further human during a performance of human motions that match a respective motion group of the plurality of motion groups that is designated as the first type;
mapping, with the processor, the plurality of real-time positions to the respective subset of recorded human motions of the respective motion group; and
based on the mapping of the plurality of real-time positions, generating, with the processor, and transmitting to the robot, with the transceiver, at least one command configured to operate the robot to perform the respective set of robot motions that match the respective motion group in synchronization with a progress of the performance of human motions that match the respective motion group.

8. The method of claim 6 further comprising:
detecting, with the at least one sensor, a plurality of real-time positions of one of (i) the human and (ii) a further human during a performance of human motions that match a respective motion group of the plurality of motion groups that is designated as the second type;
mapping, with the processor, the plurality of real-time positions to the respective subset of recorded human motions of the respective motion group; and
based on the mapping of the plurality of real-time positions, generating, with the processor, and transmitting to the robot, with a transceiver, at least one command configured to operate the robot to perform the respective set of robot motions that match the respective motion group responsive to a completion of the performance of human motions that match the respective motion group.

9. The method of claim 1, the displaying the graphical user interface further comprising:
displaying, in the graphical user interface on the display, a plurality of graphical representations of the human, each superimposed on the environment at a respective one of the plurality of recorded positions of the human in the environment.

10. The method of claim 1, wherein the sequence of robot motions to be performed by a robot includes movements between a plurality of positions of the robot in the environment over a period of time, the displaying the graphical user interface further comprising:
displaying, in the graphical user interface on the display, a plurality of graphical representations of the robot, each superimposed on the environment at a respective one of the plurality of positions of the robot in the environment.

11. The method of claim 1 further comprising:
displaying, in the graphical user interface on the display, an animation in which a virtual representation of the human performs the recorded human motions and a virtual representation of the robot performs the sequence of robot motions in concert with the performance of the recorded human motions by the virtual representation of the human.

\* \* \* \* \*